(12) United States Patent
Kollmitzer et al.

(10) Patent No.: US 12,492,922 B2
(45) Date of Patent: Dec. 9, 2025

(54) APPARATUSES AND METHODS FOR COMPARING REDUNDANT SIGNALS IN FUNCTIONAL SAFE SYSTEMS

(71) Applicant: Infineon Technologies AG, Neubiberg (DE)

(72) Inventors: Benjamin Kollmitzer, Pörtschach (AT); Wolfgang Granig, Seeboden (AT); Christof Michenthaler, Arnoldstein (AT); Mario Motz, Wernberg (AT); Peter Slama, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 853 days.

(21) Appl. No.: 17/542,884

(22) Filed: Dec. 6, 2021

(65) Prior Publication Data

US 2022/0178725 A1    Jun. 9, 2022

(30) Foreign Application Priority Data

Dec. 7, 2020    (DE) .......................... 102020132425.1

(51) Int. Cl.
*G01D 18/00* (2006.01)
*G01D 5/14* (2006.01)
(Continued)

(52) U.S. Cl.
CPC .............. *G01D 18/00* (2013.01); *G01D 5/142* (2013.01); *G01D 5/16* (2013.01); *G01P 3/44* (2013.01); *G08C 13/00* (2013.01); *H03H 17/02* (2013.01)

(58) Field of Classification Search
CPC .......... G01D 18/00; G01D 5/142; G01D 5/16; G01D 5/145; G01D 3/08; G01P 3/44;
(Continued)

(56) References Cited

U.S. PATENT DOCUMENTS 5,218,289 A * 6/1993 Besson ................... G04F 10/06
327/31
9,118,351 B2   8/2015 Vilela et al.
(Continued)

FOREIGN PATENT DOCUMENTS

CN    102680919 A    9/2012
CN    103294049 A    9/2013
(Continued)

OTHER PUBLICATIONS

Maria Adam, Nicholas Assimakis, FIR implementation of an FIR implementation for the Steady-State Kalman Filter (Year: 2008).*
(Continued)

*Primary Examiner* — Farhana A Hoque
*Assistant Examiner* — Joseph O Nyamogo
(74) *Attorney, Agent, or Firm* — Harrity & Harrity, LLP

(57) ABSTRACT

Methods and apparatuses for comparing redundant signals in functional safe systems are provided, including methods for mitigating differing signal path delays and for signal weighting of the redundant signals are proposed. An Apparatus includes a first signal path for a first measurement signal of a physical quantity, the first signal path having a first signal propagation delay; a second signal path for a second measurement signal of the physical quantity, the second signal path having a second signal propagation delay different from the first signal propagation delay; a delay compensation circuit configured to compensate for a difference between the first and second signal propagation delays to generate delay-compensated first and second measurement signals; and comparison circuitry configured to compare the delay-compensated first and second measurement signals.

31 Claims, 11 Drawing Sheets

(51) Int. Cl.
*G01D 5/16* (2006.01)
*G01P 3/44* (2006.01)
*G08C 13/00* (2006.01)
*H03H 17/02* (2006.01)

(58) Field of Classification Search
CPC ........ H03K 19/003; G01B 7/30; G08C 13/00; H03H 17/0257
See application file for complete search history.

(56) References Cited

U.S. PATENT DOCUMENTS

| | | | |
|---|---|---|---|
| 9,124,281 B2 | 9/2015 | Motz | |
| 10,134,378 B1* | 11/2018 | Cenci | A61B 5/725 |
| 10,429,839 B2 | 10/2019 | Liu et al. | |
| 11,392,133 B2 | 7/2022 | Zheng et al. | |
| 2005/0184785 A1* | 8/2005 | Shirani | H03H 15/00 327/276 |
| 2008/0048674 A1* | 2/2008 | Tan | G01R 35/005 324/638 |
| 2008/0094099 A1* | 4/2008 | Goh | H03K 5/13 326/21 |
| 2017/0131131 A1* | 5/2017 | Keech | G01F 1/588 |
| 2017/0163356 A1* | 6/2017 | Chen | H04B 17/17 |
| 2017/0163405 A1 | 6/2017 | Chen | |
| 2018/0224524 A1* | 8/2018 | Gunn | G01S 5/06 |

FOREIGN PATENT DOCUMENTS

| | | |
|---|---|---|
| CN | 105492985 A | 4/2016 |
| CN | 106226774 A | 12/2016 |
| CN | 107436383 A | 12/2017 |
| CN | 108151806 A | 6/2018 |
| CN | 110753953 A | 2/2020 |
| CN | 110799982 A | 2/2020 |
| DE | 102015111686 A1 | 1/2017 |
| DE | 102014103556 A1 | 6/2020 |
| EP | 3479176 A1 | 5/2019 |

OTHER PUBLICATIONS

Girrbach F., et al., "Adaptive Compensation of Measurement Delays in Multi-sensor Fusion for Inertial Motion Tracking Using Moving Horizon Estimation," 23rd International Conference on Information Fusion, 2020, pp. 1-9.

Jindong Z., "Research on Synchronous Measurement Technology of Multi-channel Pulse Signals Based on FPGA," Dissertation for the Degree of Master in Engineering, 2013, pp. 1-70.

* cited by examiner

APPARATUSES AND METHODS FOR COMPARING REDUNDANT SIGNALS IN FUNCTIONAL SAFE SYSTEMS

FIELD

The present disclosure generally relates to functional safe applications and, more particularly, to methods and apparatuses for comparing redundant signals in functional safe systems, such as sensor systems.

BACKGROUND

Various sensors, such as position sensors, deliver their sensing output signal via an analog or digital sensor-interface. Internal signal processing of integrated sensor systems, however, may influence the acquired signals and timing.

Signal comparison safety mechanisms provide excellent diagnostic coverage for applications requiring functional safety, especially when using diverse signal paths. Additionally, such safety mechanisms are usually straightforward to implement, requiring only comparing the difference of two signals against certain limits.

In general, diverse signal paths may generate different signal latencies due to design constraints. For high-speed applications, where signals change rapidly as function of time, state-of-the-art signal comparison mechanisms could easily lead to false alarms and loss of availability.

Thus, there may be a demand for compensating for different signal latencies of different (redundant) signal paths in functional safe applications.

SUMMARY

This demand is met by apparatuses and methods in accordance with the independent claims Some beneficial embodiments are addressed by the dependent claims.

According to a first aspect, the present disclosure proposes an apparatus for comparing a first signal and a second signal. The apparatus includes a first signal path for a first measurement signal of a physical quantity. The first signal path has a first signal propagation delay. The apparatus further includes a second signal path for a second measurement signal of the (same) physical quantity. The second signal path has a second signal propagation delay different from the first signal propagation delay. The apparatus further includes a delay compensation circuit configured to compensate for a difference between the first and second signal propagation delays to generate delay-compensated first and second measurement signals. The apparatus further includes a comparison circuitry configured to compare the delay-compensated first and second measurement signals. The delay compensation circuit may align the first and second measurement signals in time to improve their comparability. Thus, embodiments of the present disclosure may reduce false alarms and loss of availability in high-speed functional safe systems.

In some embodiments, the first and the second signal paths include respective sensor elements configured to transform the physical quantity into the first and the second measurement signals. The respective sensor elements and/or respective further circuit components of the first and the second signal paths cause the respective different signal propagation delays. Further, the first and the second signal paths may have different sampling times. This may lead to different timings between the first and the second signal paths.

In some embodiments, the delay compensation circuit is configured to trigger a first signal processing of the first signal path and a second signal processing of the second signal path at different time instances to obtain the delay-compensated first and second measurement signals at respective outputs of the first and the second signal path. That is, the respective signal processing of the different signal paths may be differently triggered to cause essentially time-aligned output signals that can be compared.

In some embodiments, a difference between a first trigger time for the first signal path and a second trigger time for the second signal path is based on a difference between the first and the second signal propagation delay and/or different sampling periods used in first and second signal paths.

In some embodiments, the delay compensation circuit is configured to trigger the first signal path earlier than the second signal path if the first signal propagation delay is longer than the second signal propagation delay, or vice versa.

In some embodiments, the delay compensation circuit includes a filter circuit configured to generate a filtered measurement signal for at least one of the first or the second signal paths, wherein the filtered measurement signal is time-aligned with the measurement signal of the other signal path. That is, alternative or additional to different trigger times, filter delays can be used to generate time aligned first and second measurement signals for comparison.

In some embodiments, the filter circuit includes, in the first or the second signal path, a finite impulse response (FIR) filter having a filter delay corresponding to a difference between the first and the second signal propagation delay. The FIR filter may be included in the signal path having the shorter signal propagation delay. In this way, the shorter signal propagation delay plus the filter delay may correspond to the longer signal propagation delay and lead to time aligned first and second measurement signals for comparison.

In some embodiments, the filter circuit includes a first FIR filter in the first signal path and a second FIR filter in the second signal path. A sum of the first propagation delay and a first filter delay of the first FIR filter equals a sum of the second propagation delay and a second filter delay of the second FIR filter. This is a further option to obtain time aligned first and second measurement signals for comparison.

In some embodiments, the filter circuit includes, in the first or the second signal path, a prediction filter having a prediction time interval corresponding to a difference between the first and the second signal propagation delay. The prediction filter may be included in the signal path having the longer signal propagation delay to predict a value which is time-aligned with the signal path having the shorter signal propagation delay.

In some embodiments, the filter circuit includes a first prediction filter in the first signal path and a second prediction filter in the second signal path. A sum of the first propagation delay and a first prediction time interval of the first prediction filter equals a sum of the second propagation delay and a second prediction time interval of the second prediction filter. This is a further option to obtain time aligned first and second measurement signals for comparison.

In some embodiments, the prediction filter includes a Kalman filter. A Kalman filter works in a two-step process. In a prediction step, the Kalman filter produces estimates of current state variables, along with their uncertainties. Once the outcome of a next measurement (corrupted with some amount of error, including random noise) is observed, these estimates are updated using a weighted average, with more weight being given to estimates with higher certainty. The algorithm is recursive. It can run in real time, using only the present input measurements and the previously calculated state and its uncertainty matrix; no additional past information is required.

In some embodiments, the comparison circuitry is configured to trigger a safety alert if the delay-compensated (or time-aligned) first and second measurement signals differ by more than a predefined threshold since this may be an indicator that one of the signal paths is not functioning properly.

In some embodiments, the apparatus may further include an interface which is configured to receive the delay-compensated (time-aligned)) first measurement signal from a first sensor in accordance with a first sensor technology and to receive the delay-compensated (time-aligned)) second measurement signal from a second sensor in accordance with a second sensor technology. The apparatus may further include a processor which is configured to compute an estimate of the physical quantity based on a combination of the delay-compensated first and second measurement signals, wherein the combination is dependent on an expected accuracy of the first and the second sensor.

For example, the first sensor technology may be a magneto-resistive sensor technology. Known magneto-resistive sensor technologies are anisotropic magnetoresistance (AMR), giant magnetoresistance (GMR), tunnel magnetoresistance (TMR), colossal magnetoresistance (CMR), or extraordinary magnetoresistance (EMR). They can be summarized under the terminology xMR. The second sensor technology may be based on the Hall-effect producing a voltage difference (Hall voltage) across an electrical conductor, transverse to an electric current in the conductor and to an applied magnetic field perpendicular to the current.

Similar to xMR sensors, vertical. Hall (VHall) sensors are capable of measuring surface-parallel or in-plane components of the magnetic field. Auto-calibrated xMR-based angle sensors suffer from suboptimal accuracy at startup and for very slow rotations. VHall-based angle sensors suffer from limited accuracy for intermediate and very fast rotations. Thus, embodiments of the present disclosure allow to obtain benefits from both technologies:

good accuracy immediately after startup, for slow angular velocities, and for start/stop use cases, and good signal-to-noise and excellent phase stability for xMR leading to excellent accuracy at intermediate and fast angular velocities.

In some embodiments, the processor is configured to combine the first and the second measurement signals dependent on a current change rate of the physical quantity (for example, angle) and/or on a respective status (for example, auto-calibration on/off) of the first and the second sensors.

According to a further aspect, the present disclosure proposes a method for comparing a first signal and a second signal. The method includes providing a first measurement signal of a physical quantity via a first signal path having a first signal propagation delay, providing a second measurement signal of the physical quantity via a second signal path having a first signal propagation delay different from the first signal propagation delay, compensating for a difference between the first and second signal propagation delays to generate delay-compensated first and second measurement signals, and comparing the delay-compensated first and second measurement signals.

According to yet a further aspect, the present disclosure proposes an apparatus for sensing a physical quantity. The apparatus includes an interface configured to receive a first measurement signal of the physical quantity from a first sensor in accordance with a first sensor technology and to receive at least a second measurement signal of the physical quantity from a second sensor in accordance with a second sensor technology. The apparatus further includes a processor configured to compute an estimate of the physical quantity based on a combination of the first and the second measurement signals. The combination is dependent on an expected accuracy of the first and the second sensor. Thus, embodiments of the present disclosure allow to combine benefits from both sensor technologies.

In some embodiments, the first measurement signal is a first angle measurement signal from a first angle sensor in accordance with a first angle sensor technology. The second measurement signal is a second angle measurement signal from a second angle sensor in accordance with a second angle sensor technology. For example, the first angle sensor includes a an xMR angle sensor and the second angle sensor includes a VHall sensor. VHall sensors have good accuracy immediately after startup, for slow angular velocities, and for start/stop use cases. xMR angle sensor have good signal-to-noise and excellent phase stability for xMR leading to excellent accuracy at intermediate and fast angular velocities.

In some embodiments, the processor is configured to combine the first and the second angle measurement signals dependent on a current angular velocity and/or on a respective status (for example, auto-calibration on/off) of the first and the second angle sensors.

In some embodiments, the processor is configured to increase a (computational) weight of the first angle measurement signal with respect to the second angle measurement signal with increasing angular velocity. This may be beneficial to give more weight to an xMR sensor when the angular velocity increases. The processor may be configured to increase a weight of the second angle measurement signal with respect to the first angle measurement signal with decreasing angular velocity. This may be beneficial to give more weight to a VHall sensor, for example, when the angular velocity decreases.

In some embodiments, the processor is configured to output the measurement signal with the best expected accuracy as the estimate. Here, the combination of the measurement signals may be of a binary nature. In case a better accuracy of the first measurement signal is expected, the first measurement signal may be weighted by 1, while the second measurement signal may be weighted by 0. In case a better accuracy of the second measurement signal is expected, the second measurement signal may be weighted by 1, while the first measurement signal may be weighted by 0.

In some embodiments, the expected accuracy of the magneto-resistive angle sensor is dependent on an autocalibration activation status of the magneto-resistive angle sensor and the expected accuracy of the vertical Hall sensor is dependent on a current angular velocity. If the autocalibration is active, for example, the expected accuracy of the xMR sensor may be higher, otherwise the expected accuracy of the VHall sensor may be higher. If the current angular velocity is below a certain threshold, the expected accuracy of the VHall sensor may be higher than that of the xMR sensor, otherwise the expected accuracy of the xMR sensor may be higher.

For autocalibration, a first offset value of a first sensor signal component (e.g. $\cos(\varphi)$) for a rotation of a measurement object may be determined. Likewise, a second offset value of a second sensor signal component (e.g. $\sin(\varphi)$) for the rotation of the measurement object may be determined. An amplitude correction value may be determined based on signal amplitudes of the first and the second sensor signal component. The first determined offset value, the second determined offset value and the determined amplitude correction value may then be used for the correction of a rotation angle estimate in an operation mode of the angle sensor.

In some embodiments, the processor includes a Kalman filter configured to compute the estimate using the first and the second measurement signals corrupted with respective measurement errors.

In some embodiments, the apparatus for sensing a physical quantity further includes a comparison circuit configured to compare the first and the second measurement signals of the different sensor technologies and to output a functional safety indicator based on the comparison. In case they deviate too much from each other, a safety measure may be initiated.

In some embodiments, the apparatus for sensing a physical quantity further includes a first signal path for the first measurement signal. The first signal path has a first signal propagation delay. The apparatus further includes a second signal path for the second measurement signal. The second signal path has a second signal propagation delay different from the first signal propagation delay. The apparatus further includes a delay compensation circuit configured to compensate for a difference between the first and second signal propagation delays to generate delay-compensated (or time-aligned) first and second measurement signals. The processor is configured to compute the estimate based on a combination of the delay-compensated first and second measurement signals. In this way, inaccuracies due to different signal processing delays/sampling times may be mitigated.

In some embodiments, the delay compensation circuit is configured to trigger a first signal processing of the first signal path and a second signal processing of the second signal path at different time instances to obtain the delay-compensated (time-aligned) first and second measurement signals at respective outputs of the first and the second signal path.

In some embodiments, the delay compensation circuit includes a filter circuit configured to generate a filtered measurement signal for at least one of the first or the second signal paths, wherein the filtered angle measurement signal is time-aligned with measurement signal of the other signal path.

According to yet a further aspect, the present disclosure proposes a method for sensing a physical quantity. The method includes receiving a first measurement signal of the physical quantity from a first sensor in accordance with a first sensor technology, receiving at least a second measurement signal of the physical quantity from a second sensor in accordance with a second sensor technology, and computing an estimate of the physical quantity based on a combination of the first and the second measurement signal, wherein the combination is dependent on an expected accuracy of the first and the second sensor.

Embodiments of the present disclosure may improve functional safe systems, such as sensor systems, with respect to accuracy and safety.

BRIEF DESCRIPTION OF THE DRAWINGS

Some examples of apparatuses and/or methods will be described in the following by way of example only, and with reference to the accompanying figures, in which.

DETAILED DESCRIPTION

Figure 1A:
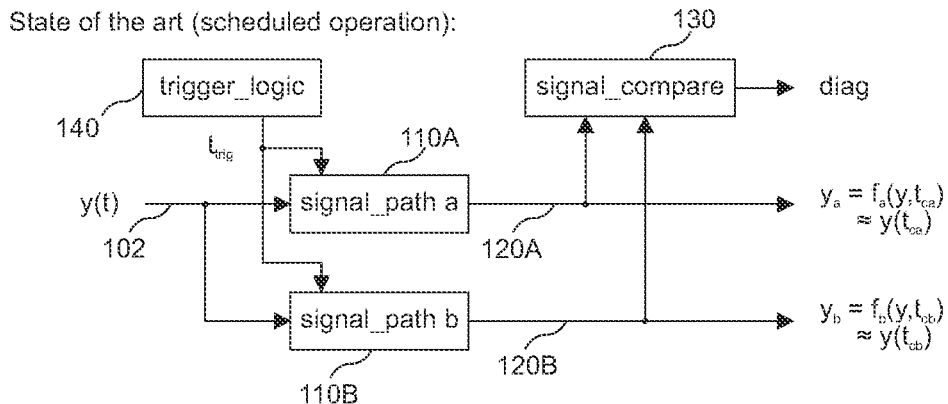
FIG. 1A shows a concept for signal comparison for scheduled (synchronous) operation, where one source triggers both signal paths.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Signal comparison safety mechanisms may provide excellent diagnostic coverage for applications requiring functional safety, especially when using diverse (redundant) signal paths. Such safety mechanisms are usually straightforward to implement, requiring comparing the difference of two signals against certain limits. Two conventional concepts for signal comparison are shown in FIGS. 1A, and 1B.

Figure 1B:
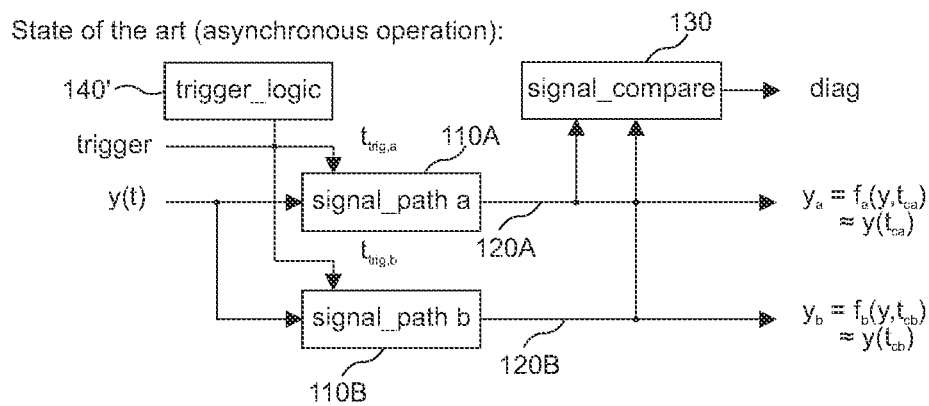
FIG. 1B shows a concept for signal comparison for asynchronous operation, where the trigger sources for both signal paths operate asynchronously.

FIGS. 1A, 1B each illustrate a first signal path 110A for a first measurement signal 120A of a physical quantity 102. The first signal path 110A has a first signal propagation delay tea. FIGS. 1A, 1B each also illustrate a (redundant) second signal path 110B for a second measurement signal 120B of the same physical quantity 102. The second signal path 110B has a second signal propagation delay $t_{cb}$ different from the first signal propagation delay $t_{ca}$. A comparison circuit 130 is configured to compare the first and second measurement signals 120A, 120B for functional safety. While in FIG. 1A a trigger logic 140 triggers both signal paths 110A, 110B synchronously, a trigger logic 140' of FIG. 1B triggers the signal paths 110A, 110B asynchronously.

According to embodiments, the first and the second signal paths 110A, 110B may comprise respective sensor elements and further respective electrical circuit components which configured to transform the physical quantity 102 into the first and the second measurement signals 120A, 120B. Depending on the implementation, the first and the second measurement signals 120A, 120B may be analog or digital signals indicative of the physical quantity 102 of interest. The first and the second signal paths 110A, 110B may be integrate in a common integrated circuit (IC), or may be implemented in different ICs, for example. The sensor elements and electrical circuit components of the first and the second signal paths 110A, 110B may not be identical and thus the respective sensor elements and/or respective further circuit components of the first and the second signal paths 110A, 110B may cause the respective different signal propagation delays $t_{ca}$, $t_{cb}$.

In some embodiments, the respective sensor elements of the first and second signal paths 110A, 110B may employ the same sensor technology. Alternatively, the sensor elements may also employ different sensor technologies. In case of rotational sensors (angle sensors), an angle sensor of the first signal path 110A may comprise an xMR angle sensor, for example. In some embodiments, an angle sensor used for the second signal path 110A could also be an xMR angle sensor or could be implemented as a Hall-sensor. In some embodiments, the angle sensors of both signal paths 110A, 110B could both be implemented as Hall-sensors. Embodiments with sensor elements of different sensor technologies will be addressed in more detail at the end of this disclosure.

Apart from the sensor elements, the respective signal paths 110A, 110B may comprise further circuit components such as analog-to-digital converters (ADC), signal processing for offset compensation, and signal processing for converting measurement signals to angle estimates, for example. Sampling times of respective ADCs of the signal paths 110A, 110B may differ, also contributing to the different signal propagation delays $t_{ca}$, $t_{cb}$.

Figure 1C:
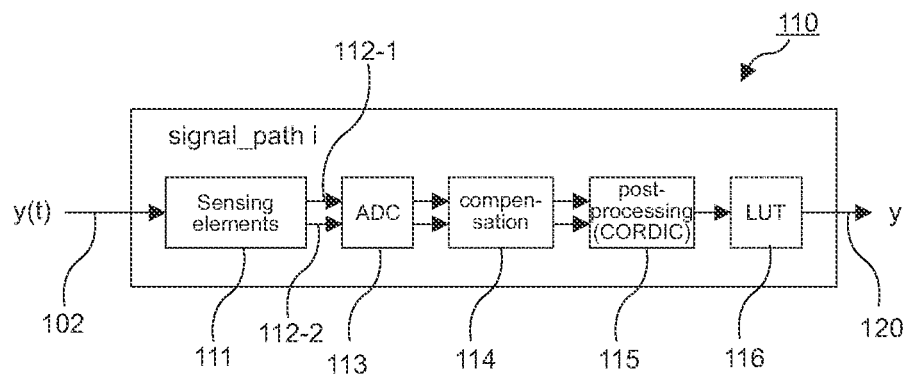
FIG. 1C shows a typical signal path architecture.

An example signal path 110 for angle sensing applications is schematically illustrated in FIG. 1C.

A physical signal of interest 102, for example a rotating magnetic field, may be converted to electrical signals via one or more sensing elements 111. In angle sensing applications, the sensing elements 112 may deliver a first analog signal component 112-1 ideally corresponding to cos(α) and a second analog signal component 112-2 ideally corresponding to of sin(α), where α denotes an angle to be measured based on the rotating magnetic field. Subsequent analog-to-digital converters (ADCs) 113 may convert the analog signal components 112-1, 112-2 to the digital domain. Instead of the ADC 113, amplifiers could be used if one wants to process the signal components 112-1, 112-2 directly in the analog domain. Optional compensation circuitry 114 (for example, autocalibration circuitry) may minimize unintended effects of non-idealities of the sensing elements 111 and ADC 113 on the signal components 112-1, 112-2. Post-processing 115 may estimate the physical quantity of interest (e.g., angle α) from the one or many signals provided by the ADC 113 and optional compensation 114. For angle sensors, a CORDIC (COordinate Rotation DIgital Computer) 115 may be used to calculate the angle from the cos- and sin-components 112-1, 112-2 generated by the sensing elements 111. Finally, a look-up table (LUT) 116 or more advanced schemes can be used to compensate further signal non-idealities.

The skilled person having benefit from the present disclosure will appreciate that the analog and digital signal processing of a signal path 110 from a sensor element to the estimate or measurement signal 120 causes a signal propagation delay. Thus, internal signal processing of integrated sensor systems influence the acquired signals and timing. This is illustrated in FIG. 2A.

Figure 2A:
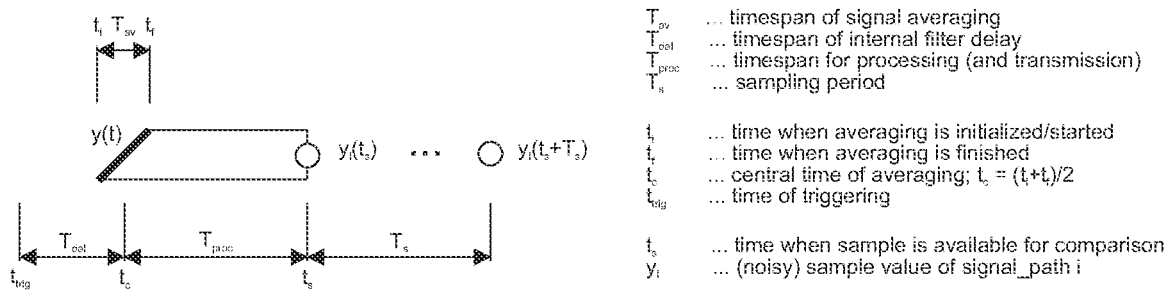
FIG. 2A illustrates a timing of a signal path.

FIG. 2A schematically shows a timing of an example signal path 110. In general, any signal path may acquire the physical signal of interest y(t) 102 over a certain timespan $T_{av}$, starting at time $t_i$ and ending at time $t_f$. The signal of interest could be, for example, the angle α of a rotating magnetic field. The timespan $T_{av}$ might be given by, for example, a filter bandwidth, chopping and spinning current schemes, etc. For simplicity, a central time of this averaging timespan is denoted by $t_c$.

A trigger of sample acquisition is assumed at a certain time $t_{trig}$. A certain timespan $T_{del}$ later, the central time $t_c$ of averaging is encountered. Depending on the signal path architecture, the central time $t_c$ might come even before the trigger time—in such cases $T_{del}$ is negative. Signal processing and optional transmission takes another timespan $T_{proc}$. After the accumulated timespan ($T_{del}+T_{proc}$), at the time $t_s$, the triggered sample $y_i$ (measurement signals 120A, 120B) would be available for signal comparison. As a good approximation, the sample $y_i$ will correspond to the physical signal at the central time $t_c$, thus $y_i \approx y(t_c)$. Therefore, this central time $t_c$ will also be referred to as effective sample time. The sampling period $T_s$ may be defined as the timespan until the next sample becomes available.

Figure 2B:
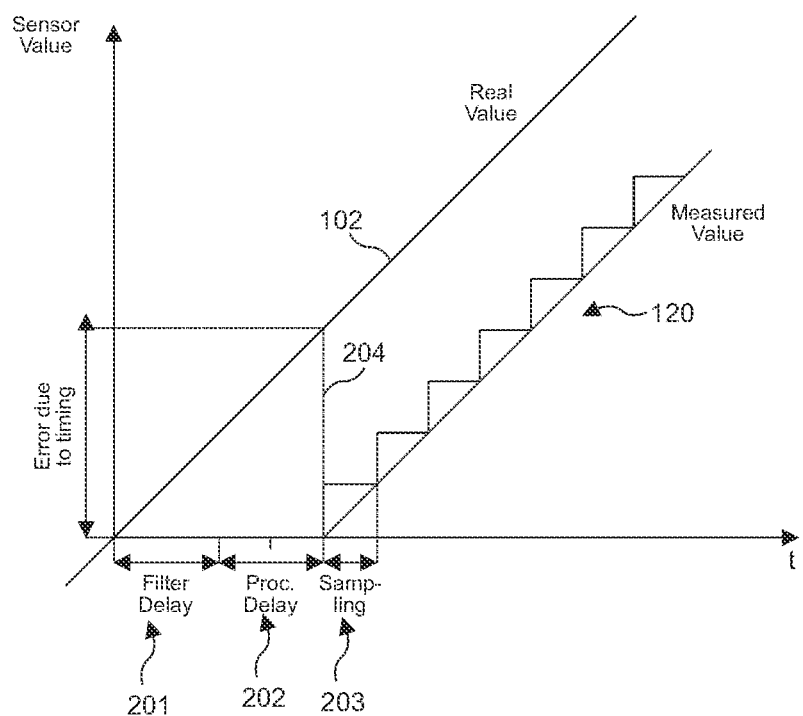
FIG. 2B illustrates a sensor error caused by processing delay, filter delay and sampling.

FIG. 2B schematically illustrates the effects of filter and signal processing delays in a signal path 110.

Reference numeral 102 denotes actual course of a physical quantity of interest such as, for example, an angle of a rotating magnetic field. Internal signal processing along a signal path 110 of a sensor device includes different time delays, such as filter delay 201, processing delay 202, for example due to sampling and digital signal processing, and additional timing effects 203 due to sampling. This internal signal processing leads to an offset or error 204 between the actual physical quantity 102 and the output measurement signal 120.

Signal comparison safety mechanisms, as illustrated in FIG. 1A, 1B, may provide excellent diagnostic coverage for applications requiring functional safety, especially when using diverse signal paths 110A, 110B. Additionally, such safety mechanisms are usually straightforward to implement, requiring comparing the difference of two signals against certain limits. However, diverse signal paths 110A, 110B may generate different signal latencies due to design constraints. For high-speed applications, where signals may change rapidly as function of time, conventional signal comparison mechanisms may lead to false alarms and loss of availability.

For both synchronous and asynchronous concepts illustrated in FIG. 1A, 1B, the measurement signals 120A, 120B provided by the two signal paths 110A, 110B for signal comparison correspond to the physical signal of interest 102 at different points in time. For high-speed applications, these time differences may introduce unintentional differences of the sample values or measurement signals 120A, 120B.

Figure 2C:
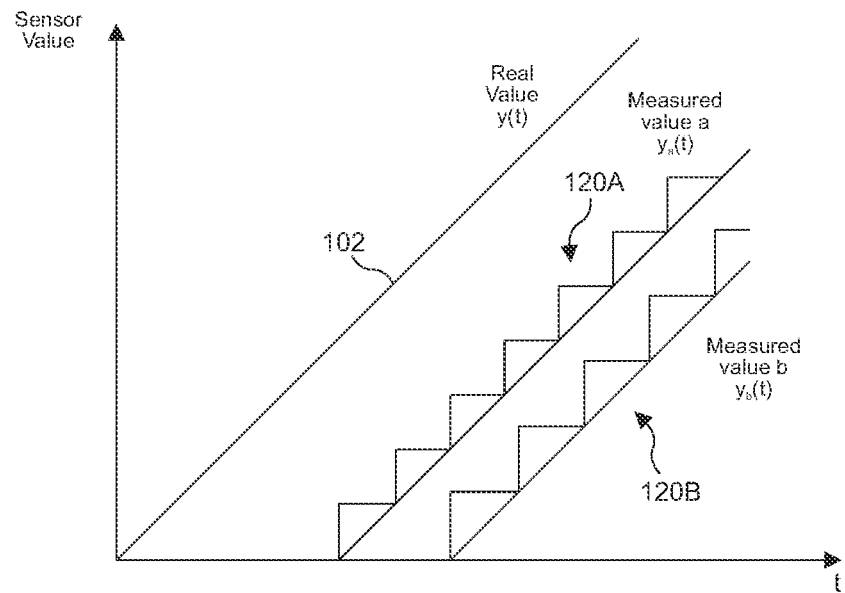
FIG. 2C illustrates sensor outputs of two different sensor data-paths with different delay and sampling.
Figure 2D:
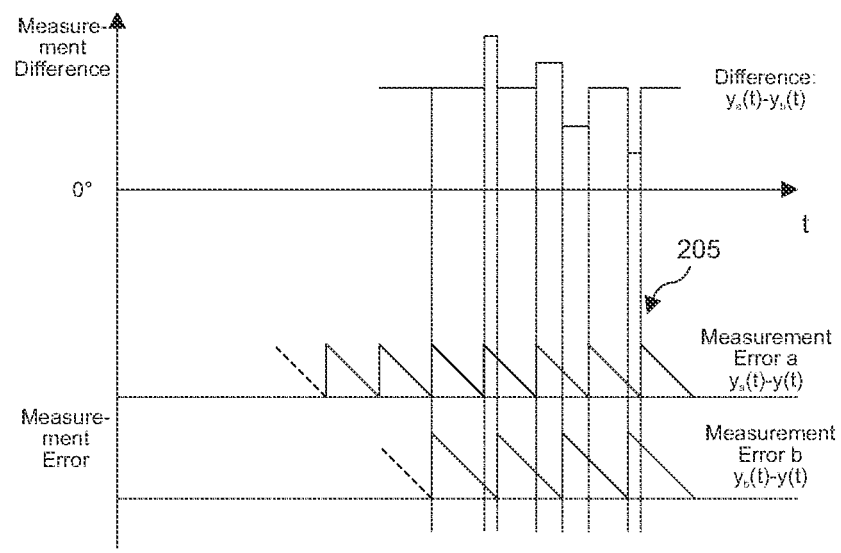
FIG. 2D shows an error between sensor outputs of two different sensor data-paths.

A graphical explanation of false alarms caused by different timings between two sensing signal paths 110A, 110B is shown in FIG. 2C, showing two different measurement signals 120A, 120B of the same physical quantity 102 measured with two different measurement signal paths 110A, 110B comprising different signal propagation delays and sampling times. The resulting error 205 when comparing these two measurement signals 120A, 120B can be seen in FIG. 2D. As can be seen, the error 205 due to timing mismatches between the two measurement signals 120A, 120B may never be zero. An error 205 exceeding a certain error threshold may even lead to a false alarm in a functional safety system.

One approach could be considering this effect and relaxing the limits for the signal compare safety mechanism in block 130 accordingly. However, this might not be possible for high accuracy applications and thus reduce the achievable diagnostic coverage of the safety mechanism.

As has been explained before, different and especially diverse signal paths 110A, 110B have in general different timing properties. For optimal signal comparison, the target should be achieving as similar effective sampling times to for the different signal paths as possible. In high-speed applications, accurate timing for safety mechanisms, which compare signals of different signal paths, may be of vital importance. Embodiments of the present disclosure propose various concepts ensuring optimal timely agreement between samples 120A, 120B from different signal paths, thus keeping the error 205 between two redundant measurement signals 120A, 120B of the same physical quantity possibly low.

Figure 3:
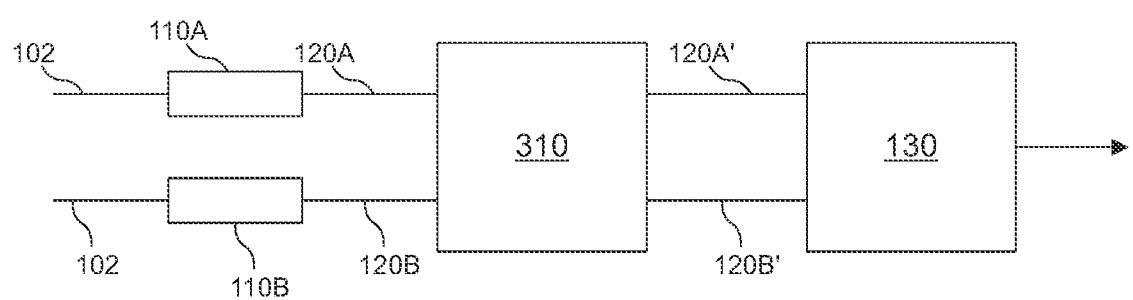
FIG. 3 shows a block diagram of an apparatus for comparing a first signal and a second signal according to embodiments of the present disclosure.

FIG. 3 illustrates a block diagram of an apparatus 300 for comparing a first signal and a second signal in accordance with embodiments of the present disclosure.

The apparatus 300 comprises a first signal path 110A for a first measurement signal 120A of a physical quantity 102. The first signal path 110A has a first signal propagation delay tea. The apparatus 300 also comprises a (redundant) second signal path 110B for a second measurement signal 120B of the physical quantity 102. The second signal path 110B has a second signal propagation delay $t_{cb}$ different from the first signal propagation delay $t_{ca}$. The apparatus 300 comprises a delay compensation circuit 310 which is configured to compensate for a difference d between the first and second signal propagation delays delay $t_{ca}$, $t_{cb}$ to generate delay-compensated or time-aligned first and second measurement signals 120A', 120B'. The apparatus 300 also comprises comparison circuit 130 configured to compare the delay-compensated first and second measurement signals 120A', 120B' for functional safety. Comparison circuit 130 may correspond to conventional comparison schemes or may comprises additional signal combination functionalities in case sensors of different sensor technologies are employed. This will be described in more detail later.

Although the present disclosure focusses on signal comparison of two signals 120A', 120B', it should be noted that the proposed concepts are applicable as well for comparing more signals, e.g. for three or four signals. The skilled person having benefit from the present disclosure will also appreciate that the comparison circuit 130 can be implemented together with the signal paths 110A, 110B in one sensor device, or externally. For the case of external signal comparison, the signal paths 110A, 110B can be implemented in one device or in two separate devices.

In the following, an embodiment for obtaining equal effective sampling times and thus an optimal signal comparison for synchronous operation of the signal paths 110A, 110B will be described with reference to FIG. 4.

Figure 4A:
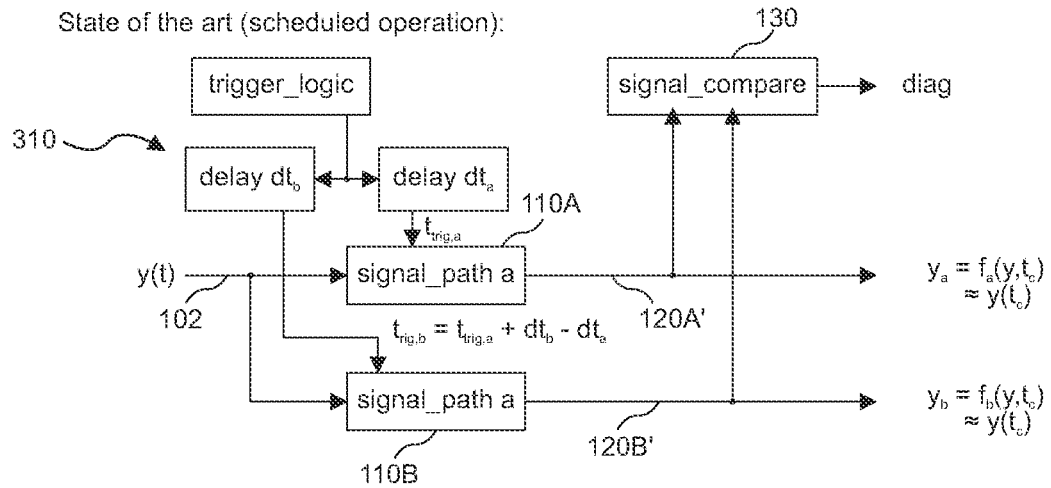
FIGS. 4A and 4B illustrate concepts for high-speed signal compare circuits suitable for scheduled operation.

FIG. 4A schematically illustrates an apparatus 400 for comparing a first signal 120A and a second signal 120B, where the delay compensation circuit 310 is configured to trigger a first signal processing for sample acquisition of the first signal path 110A and to trigger a second signal processing for sample acquisition of the second signal path 110B at different time instances to obtain the delay-compensated (time-aligned) first and second output signals 120A', 120B' at respective outputs of the first and the second signal path 110A, 110B. A difference between a first trigger time for the first signal path 110A and a second trigger time for the second signal path 110B may be based on a difference between the first delay and the second signal propagation delay and/or different sampling periods used in first and second signal paths 110A, 110B. For example, the delay compensation circuit 310 may be configured to trigger the first signal path 110A earlier than the second signal path 110B if the first signal propagation delay is longer than the second signal propagation delay, or vice versa.

For example, it may be assumed that the two signal paths 110A, 110B have internal filter delays of $T_{del,a}$ and $T_{del,b}$, and without loss of generality it may be defined that $dt_a = T_{del,b} - T_{del,a}$ and assumed that $dt_a > 0$, i.e., the filter delay of signal path 110B is larger than the filter delay of signal path 110A. In this case, a trigger delay $dt_b$ for signal path 110B may be skipped, i.e. $dt_b = 0$. Suppose at time t=0, the delay compensation circuit 310 including a trigger logic outputs a trigger pulse. Signal path 110B may be triggered immediately and acquire a measurement sample $y_b$ 120B' with effective sampling time $t_{c,b} = T_{del,b}$. Signal path 110B may output the sample $y_b$ at a time $t_{s,b} = T_{del,b} + T_{proc,b}$. Apart from signal path imperfections and effects of averaging, this sample $y_b$ corresponds to the physical signal of interest y(t) 102 at the effective sampling time $t_{c,b}$, i.e. $y_b \approx y(t_{c,b})$.

Signal path 110A receives a delayed trigger at $t_{trig,a} = dt_a = T_{del,b} - T_{del,a}$ from delay compensation circuit 310 including the trigger logic. Signal path 110A acquires a measurement sample $y_a$ 120A' with effective sampling time $t_{c,a} = t_{trig,a} + T_{del,a} = t_{c,b}$, i.e. with the same effective sampling time as signal path 110B. Signal path 110A outputs the sample $y_a$ at a time $t_{s,a} = T_{del,a} + T_{proc,a}$. Although the sample $y_a$ becomes in general available at another point in time than sample $y_b$, it corresponds to the sample physical signal of interest y(t) at the same effective sampling time $t_{c,b}$, i.e. $y_a \approx y(t_{c,b})$. Thus, the signal comparison circuit 130 only needs to fetch each measurement sample 120A', 120B' when it becomes available and compare their difference against certain thresholds.

In some embodiments, however, diverse signal paths 110A, 110B might need different sampling periods $T_{s,A}$, $T_{s,B}$. For signal comparison, it may make sense to choose the longer sampling period as a multiple of the shorter sampling period. The general concept of FIG. 4A may also be suitable for such operations upon small adaptations, see FIG. 4B. In this case, the delay compensation circuit 310 including the trigger logic may output the already properly delayed trigger pulses to both signal paths 110A, 110B. For the signal path 110A, 110B with the longer sampling period, the delay compensation circuit 310 including the trigger logic may omit as many trigger pulses as necessary to reach the desired effective sampling period. Additionally, the delay compensation circuit 310 including the trigger logic may signal to the comparison circuit 130, when to fetch which measurement sample $y_a$, $y_b$ for comparison.

Figure 4B:
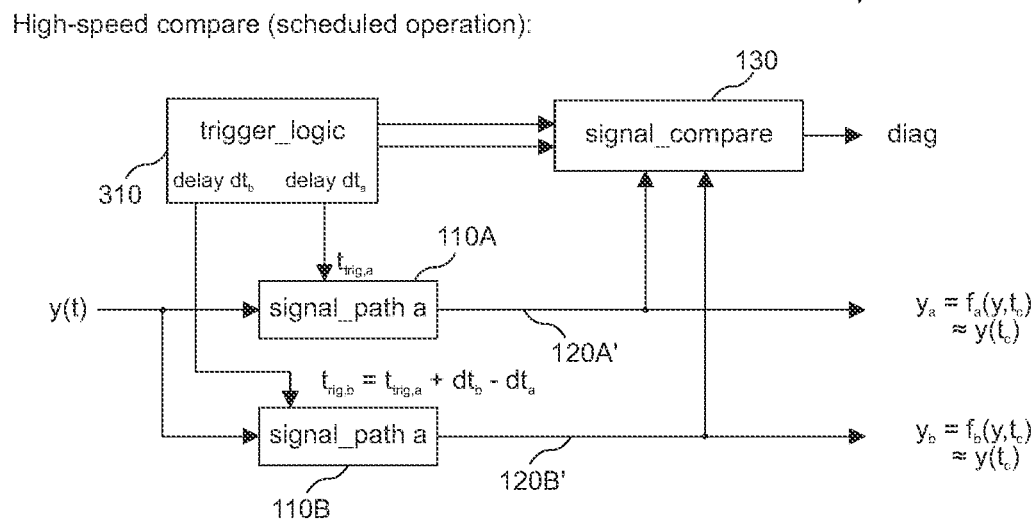

With the concept of FIG. 4B, the comparison circuit 130 may operate according to the longer sampling period and not compare every single output sample. If this is the target, implementation of an interpolation mechanism may be adequate for asynchronous operation, which will be described in the following.

For asynchronous operation (see FIG. 1B), the timing between the trigger points $t_{trig,A}$, $t_{trig,B}$ may not be exactly controllable. Thus, an interpolation mechanism (or even extrapolation) may be required.

Figure 5A:
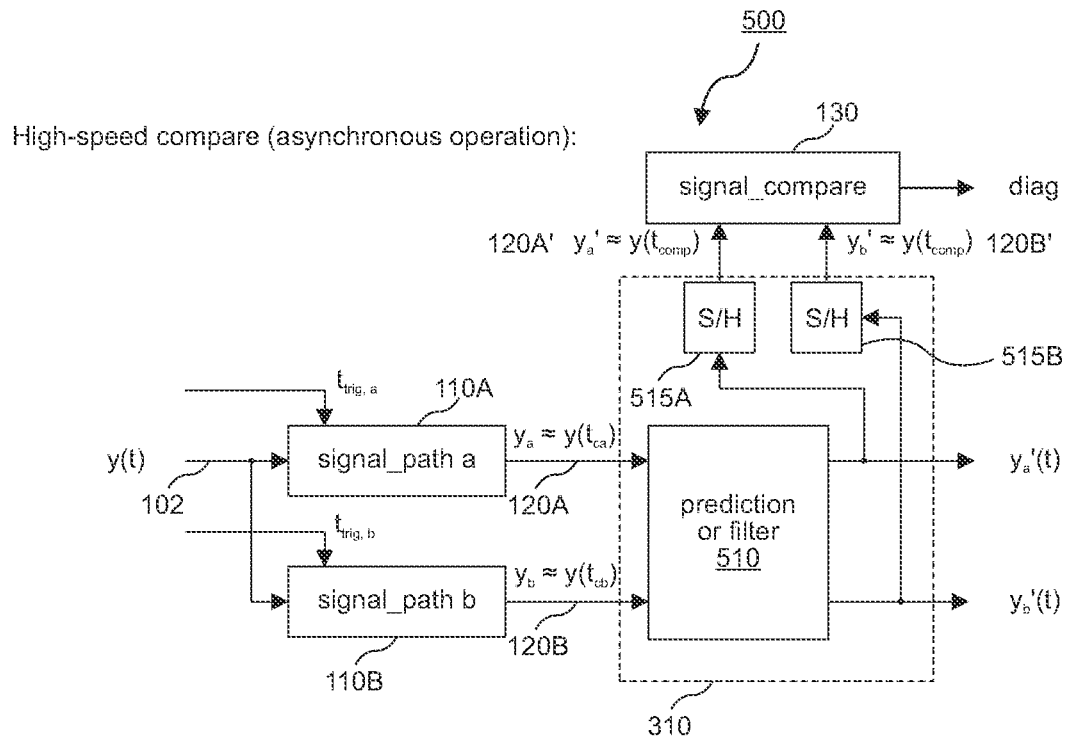
FIG. 5A shows a concept for high-speed signal compare circuits suitable for asynchronous operation.

FIG. 5A shows an embodiment of an apparatus 500 for comparing a first signal and a second signal for asynchronous operation of the signal paths 110A, 110B.

For asynchronous operation, delay compensation circuit 310 may comprise a filter circuit 510 coupled to the respective outputs of signal paths 110A, 110B and configured to generate a filtered measurement signal for at least one of the first or the second signal paths 110A, 110B. The filtered measurement signal 120A' or 120B' is essentially time-aligned with the other measurement signal 120B' or 120A' of the other signal path. Additionally, delay compensation circuit 310 may comprise respective sample and hold (S/H) circuits 515A, 515B coupled between filter circuit 510 and comparison circuit 130 and associated with the respective signal paths 110A, 110B. Filter circuit 510 may perform interpolation/extrapolation of at least one of the measurement signals 120A or 120B provided at the output of signal paths 110A, 110B. Together with the S/H circuits 515A, 515B, filter circuit 510 may equalize the timing of the two measurement signals under comparison.

Figure 5B:
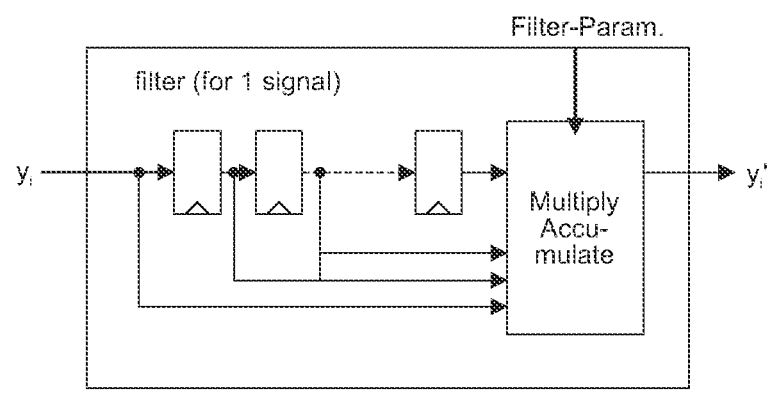
FIG. 5B illustrates a Finite Impulse Response (FIR) filter for additional insertion of a defined signal delay to each channel.

For delay-synchronization, simple digital filters can be used to reduce the bandwidth of the signal path with higher bandwidth (faster channel) to that of the lower bandwidth signal path (slower channel). Most functional safety applications require safety-reaction times much larger than a sensor signal update-time, which allows an additional filtering of the faster channel. For example, Finite Impulse Response (FIR) filters may be used in this context with constant phase delay as shown in FIG. 5B. The FIR filter may have a filter delay corresponding to a difference between the first and the second signal propagation delay. The skilled person having benefit from the present disclosure will appreciate that also other filters with appropriate filter delays can be used.

Figure 6A:
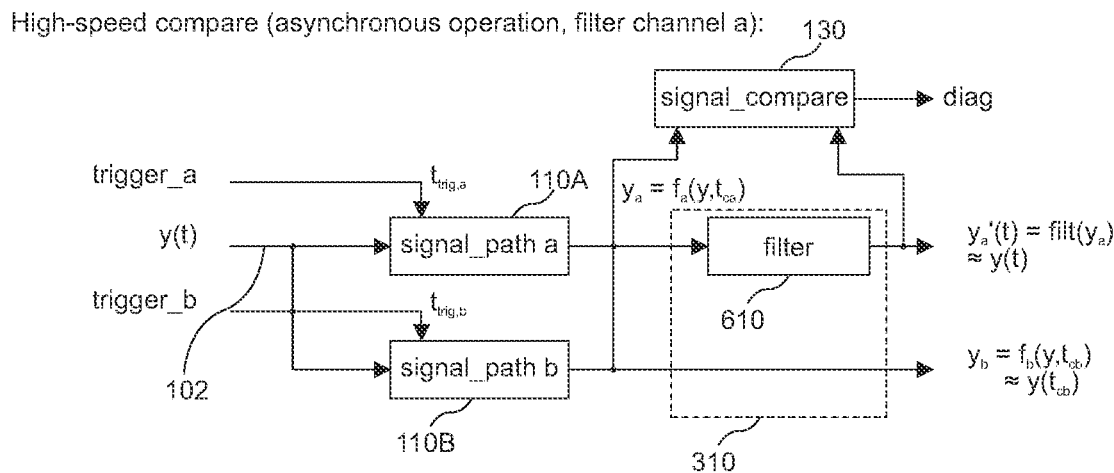
FIGS. 6A and 6B show concepts for synchronizing a high bandwidth channel to a low bandwidth channel in accordance with embodiments.
Figure 6B:
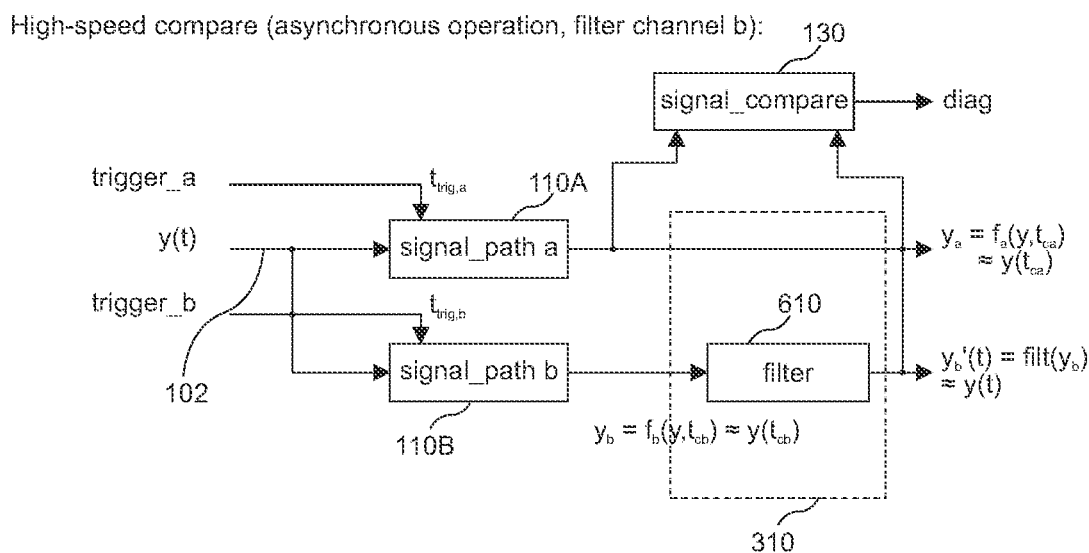

FIG. 6A, 6B show different implementations of synchronizing a high bandwidth signal path to a low bandwidth signal path. While FIG. 6A illustrates filtering of a fast signal path 110A to a slower signal path 110B, FIG. 6B illustrates filtering of a fast signal path 110B to a slower signal path 110A.

In case of channel a comprising a fast, high bandwidth signal path, the timing can be synchronized by reducing the bandwidth by a digital filter 610. This concept has the benefit of providing delay-compensated sample values 120A and/or 120B. In case of signal path 110A representing the fast, high bandwidth channel this idea can be implemented according to FIG. 6A. Here, a digital FIR filter 610 is coupled in between the output of signal path 110A and comparison circuit 130, while the output of signal path 110B is directly coupled to comparison circuit 130. The case of signal path 110B representing the fast, high bandwidth channel this is shown in FIG. 6B. Here, the digital FIR filter 610 is coupled in between the output of signal path 110B and comparison circuit 130, while the output of signal path 110A is directly coupled to comparison circuit 130. Thus, the FIR filter 610 is included in the signal path having the shorter signal propagation delay (higher bandwidth).

Comparison of this high and low speed sensing channels works as follows for this concept (FIG. 6A):

1. The signal paths 110A, 110B should be triggered synchronously due to adjacent filtering.

2. The digital filter 610 is operated at the same or integer multiplied or divided digital clock frequency as the signal path 110A. The digital filter 610 parameters may be adjusted in a manner that the signal delay of delayed signal path 110A matches with digital data of signal path 110B.

3. The synchronous processed and filtered signal 120A' is then compared with the synchronized output 120B of signal path 110B to generate the diagnostic output.

In case of one channel comprising a fast, high bandwidth signal path and the other channel with a slow, low bandwidth signal path, the low bandwidth channel outputs may be treated in a way to implement a signal prediction to fit the signal delay of the fast, high bandwidth channel. For this purpose, a prediction filter may be foreseen in the first signal path 110A or the second signal path 110B, the prediction filter having a prediction time interval essentially corresponding to a difference between the first and the second signal propagation delay. Here, prediction time interval denotes a time interval which the prediction filter "looks"

into the future. This concept may have the benefit of providing delay-synchronized samples.

Figure 7A:
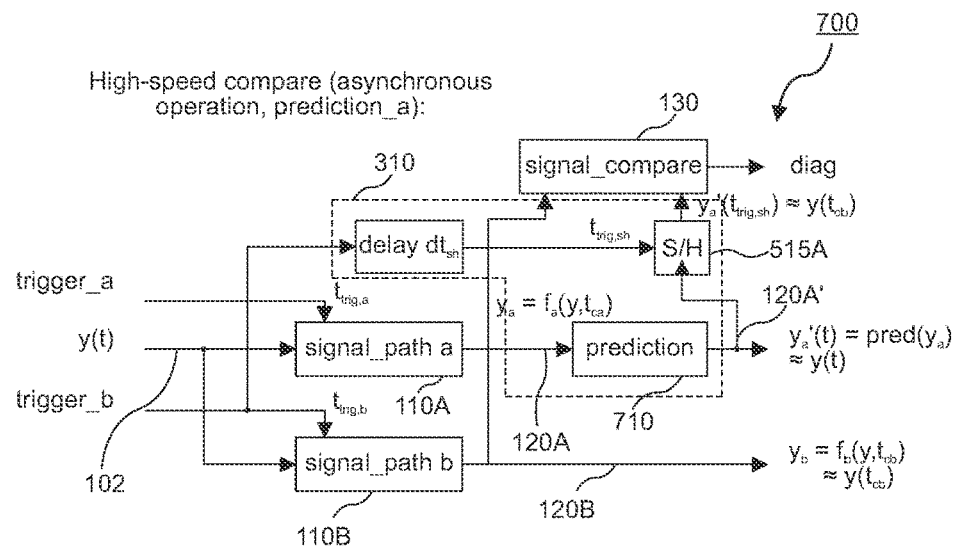
FIGS. 7A and 7B illustrate an adaption of delay difference between the two sensing channels by signal prediction of the slow channel to the fast channel which can be done by predicting signals of slow channel a to synchronize the delay of high-bandwidth channel to the low bandwidth channel.
Figure 7B:
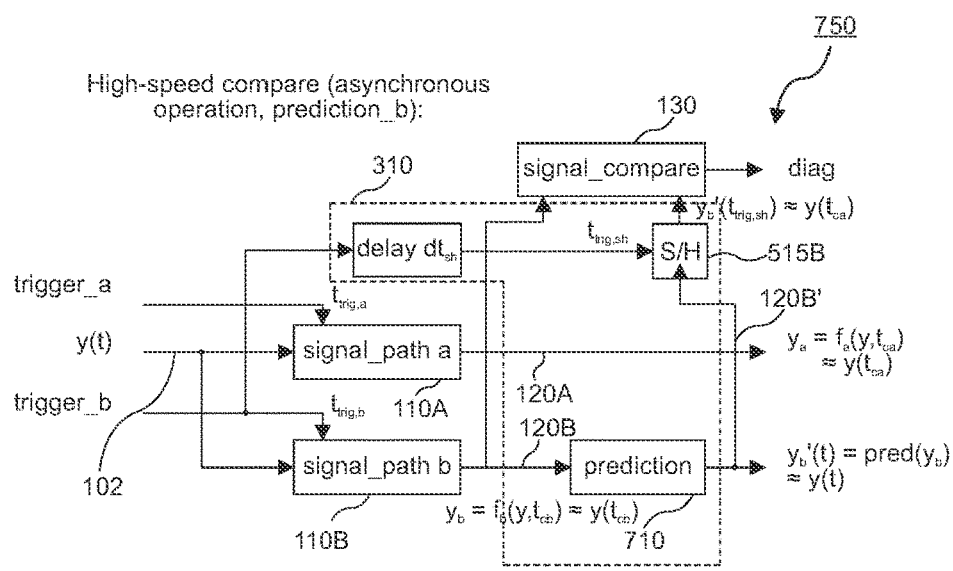

FIG. 7A schematically shows an implementation where signal path 110A represents the slow, low bandwidth channel which output is predicted by prediction filter 710 coupled between signal path 110A and signal comparison circuit 130 to match with the fast signal path 110B. FIG. 7B schematically shows an implementation where signal path 110B represents the slow, low bandwidth channel which output is predicted by prediction filter 710 coupled between signal path 110B and signal comparison circuit 130 to match with the fast signal path 110A. The samples, which the sensor apparatus 700, 750 outputs at a certain point in time t, directly estimate the physical signal of interest 102 at this time t. This implementation may therefore be suited for low latency interfaces, e.g. incremental interface (IIF) and Hall-switch mode (HSM) for angle sensors.

Figure 7C:
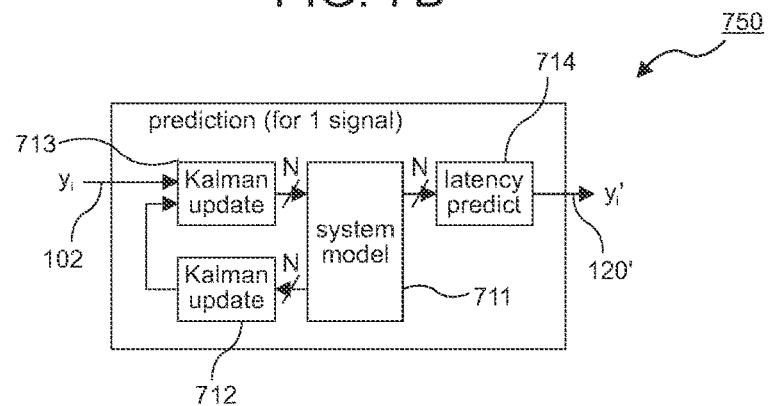
FIG. 7C shows a block diagram of a Kalman filter.

For example, the prediction filter 710 may comprise a Kalman filter, which is schematically shown in FIG. 7C.

FIG. 7C shows an exemplary implementation of the prediction filter 710, i.e. for the prediction/interpolation of one or both signals $y_a$, $y_b$. To predict both signals independently from one another, respective prediction filters 710 may be used for each signal path 110A, 110B. Specifically for high-speed signal comparison, however, it may suffice to predict/interpolate only one of the signals, either $y_a$ or $y_b$.

By using a Kalman filter for state space estimation as the prediction filter 710, one can minimize the effect of inevitable signal noise on the prediction. While this might not be strictly required if one restricts the adjustment of the sample times to interpolation, it may improve interpolation quality and may be recommended for any kind of signal extrapolation. For adequate systems, a Kalman filter may provide the optimal estimator from signal theory point.

Typical system state spaces comprise estimators for the signal of interest y(t) 102, its first derivative dy(t)/dt, and optional higher order derivatives $d_n y(t)/d_n$, and the uncertainties of these estimators in terms of their covariance matrix. For sufficiently fast sampling periods and well-behaved physical signals of interest y(t), a linearized first order system model up to dy(t)/dt may suffice for acceptable accuracy. Then, linear Kalman filters suffice, which can be implemented very efficiently with limited computational resources.

What follows is a short explanation of the Kalman filter: At any point in time, a system model 711 reflects the available knowledge about the estimators and their uncertainty (via their covariance matrix) based on all previously acquired samples. When a new sample arrives (or ideally shortly before), a Kalman predict block 712 calculates an expected sample and its uncertainty based on the available knowledge. A Kalman update block 713 compares the measured sample $y_i$ against this expected sample and updates the system model 711 appropriately.

Because delayed samples $y_i \approx y(t_{c,i})$ are provided to the Kalman filter 710, also its state estimations correspond to these delayed times. The optimal estimator, $y_i' \approx y(t)$, for the physical signal of interest 102 at the present point in time (or actually any other time point $t > t_{c,i}$) may be calculated by a latency predict block 714. In general, this may be the same operation, which the Kalman predict block 712 already performs. Therefore, these two blocks may be combined in an implementation.

As alternative a simpler concept for prediction would be linear interpolation/extrapolation. With each new sample $y_i$ with corresponding effective sampling time $t_{c,i}$, received by the prediction filter 710, a finite difference quotient $\Delta y_i/\Delta t = (y_i - y_i(\text{old}))/(t_{c,i} - t_{c,i}(\text{old}))$ using the previously received sample $y_i(\text{old})$ and its effective sampling time $t_{c,i}(\text{old})$, may be calculated. $\Delta y_i/\Delta t$ and additionally $y_i$ and $t_{c,i}$ need to be stored. Then, the physical signal of interest $y_i'(t)$ at a certain time t can be estimated with linear interpolation/extrapolation according to $y_i'(t) = y_i + \Delta y_i/\Delta t \cdot (t - t_{c,i})$. Of course, this scheme may be inferior to a properly designed Kalman filter for extrapolation due to the effect of signal noise on the difference quotient. For interpolation, however, the performance of this scheme might be sufficient.

High-speed comparison works as follows for the concept of FIG. 7:

1. The signal path 110A should be triggered as often as possible. This provides the best performance of the subsequent prediction. Due to prediction, estimators for the physical signal of interest are available (virtually without delay) for any time of interest.

2. When the "safety" signal path 110B is triggered, say at a time $t_{trig,b}$, this trigger signal may be delayed by the timespan $dt_{sh}$ (which should equal $T_{del,b}$) and then forwarded to the S/H block 515. This delay ensures that the trigger for the S/H block 515A $t_{trig,sh} = t_{trig,b} + dt_{sh}$, coincides with the effective sample point $t_{c,b}$ for signal path 110B.

3. Upon being triggered, the S/H block 515A may fetch the predicted sample $y_a'$ from signal path 110A and store it for the subsequent signal comparison. As described above, this sample reflects the physical signal of interest at time $t_{c,b}$, thus $y_a' \approx y(t_{c,b})$ 4. As soon as the sample $y_b$ from signal path 110B is available, the signal comparison circuit 130 compares the two input signals: the sample $y_a' \approx y(t_{c,b})$ stored in the S/H block 515A from signal path 110A, and the sample $y_b \approx y(t_{c,b})$ provided directly by the signal path 110B. Because both samples correspond to the physical signal of interest at the same point in time, an optimal signal comparison with tight limits and good diagnostic coverage is possible.

As additional benefit of this concept, the signal comparison circuit 130 inherently checks the prediction. Thus, it may ensure that the physical signal of interest has actually evolved as predicted by the system model 711 in the Kalman filter/prediction block 710.

With small adaptations, this implementation may suit interfaces with constant latency (i.e. low jitter) as well. In this case, the latency predict block would be configured slightly different. Say, the interface adds a latency of $T_{tx}$ for transmitting the information. Then, one would add this timespan to the configured prediction time of the latency predict block, such that it provides at any time t a value $y_a'(t)$ corresponding to the physical signal at time $(t+T_{tx})$, i.e. $y_a'(t) \approx y(t+T_{tx})$. Transmission via the constant latency interface lasts a timespan $T_{tx}$. Then, the received value, say $y_a''$, corresponds again to the physical signal at the correct point in time, $y_a''(t+T_{tx}) \approx y(t+T_{tx})$. Of course, the delay block has to be adjusted accordingly, i.e. to a delay of $dt_{sh} = T_{del,b} + T_{tx}$.

The implementation shown in FIG. 7A implements prediction/interpolation for the "safety" signal path 110B. Although the concept looks similar to the prediction of signal path 110A (FIG. 7B), the idea is different. In FIG. 7B, every sample provided by signal path 110A is output as fast as possible and used in the system. Usual systems anyways employ a kind of regulation loop with delay compensation. Therefore, this implementation may spare the additional effort (and any errors introduced by it) for an extra prediction of the main signal path inside the sensor. The safety time may be considerably longer than the functional latency requirement for the application. This means, that the actual samples should be output as fast as possible, but the signal comparison can be performed at a later point in time.

The procedure for this implementation can be as follows:

1. The "safety" signal path 110B should be triggered as often as possible, say with a sampling period $T_{s,b}$. This provides the best possible data for signal comparison. Different implementations for the prediction block 710 are conceivable: Of course, one can implement a full-blown Kalman filter as for signal path 110A above. However, the simpler linear interpolation scheme described above may be chosen for this implementation.

In this case, for any time t, the prediction block 10 should interpolate the samples corresponding to the time $(t-T_{s,b}-T_{proc,b})$. In terms of the linear interpolation, this results in $y_b'(t)=y_b+\Delta y_b/\Delta t^*(t-T_{s,b}-T_{proc,b}-t_{c,i}) \approx y(t-T_{s,b}-T_{proc,b})$. This behavior may ensure that the prediction block 710 is always operated in interpolation mode and does not have to extrapolate. This may minimize errors due to sampling noise.

2. When the main signal path 110A gets triggered, say at a time $t_{trig,a}$, this trigger signal may be delayed by a certain timespan $dt_{sh}$ and then be forwarded to the S/H block 515B. This delay may ensure that a new sample of signal path 110B is available for signal comparison, for which the effective sampling time is not earlier than the effective sampling time of the triggered sample from signal path 110A, thus $t_{c,b} \geq t_{c,a}$. This allows us to limit the prediction block 710 to signal interpolation instead of extrapolation (which would introduce unnecessary errors due to signal noise and delay).

One option is to delay the trigger by a fixed time, $dt_{sh}=T_{del,a}+T_{proc,b}+T_{s,b}$. After this timespan, a new sample from signal path 110B is available, for which $t_{c,b} \geq t_{c,a}$ holds. Thus, only interpolation and no signal extrapolation is required.

3. When the triggered sample from signal_path a, $y_a \approx y(t_{ca})$, becomes available, the signal comparison block 130 may store it for later comparison.

4. When the delayed trigger arrives at the S/H block 515B at time $t_{trig,sh}=t_{trig,a}+dt_{sh}$, the S/H block 515B may obtain a sample $y_b'(t_{trig,sh})$ from the prediction block 710. Due to the definition in step 1, this sample corresponds to $y_b'(t_{trig,sh}) \approx y(t_{trig,sh}-T_{s,b}-T_{proc,b})=y(t_{ca})$, i.e. to the effective sampling time of signal from signal path 110A.

Again, both samples correspond to the physical signal of interest at the same point in time. Therefore, an optimal signal comparison with tight limits and good diagnostic coverage is possible.

Figure 8A:
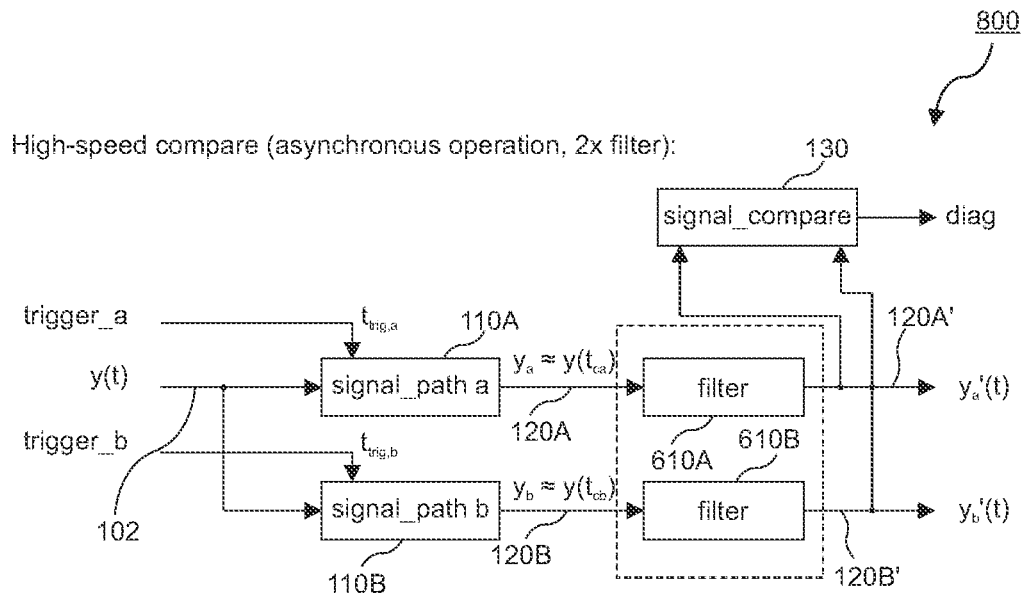
FIGS. 8A and 8B illustrate concepts of implementing a filter or prediction on both channels with fitted delay to compensate a remaining signal bandwidth and delay difference.
Figure 8B:
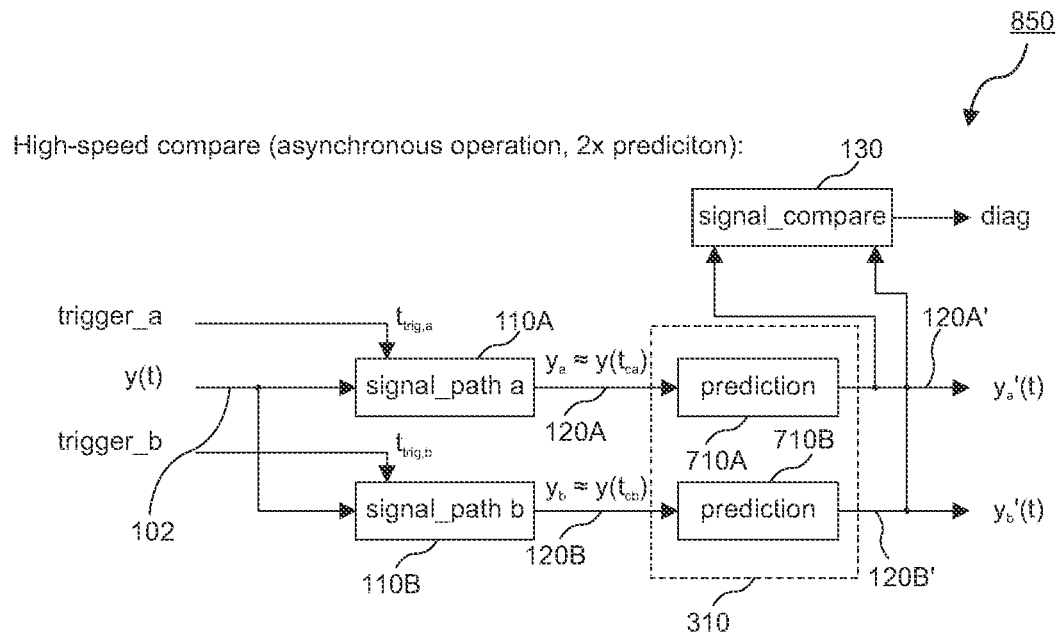

Another example implementation can be done by delaying both channels by respective filters, which may also compensate delay differences. Potential implementations are shown in FIGS. 8A, 8B, where FIG. 8A presents individual filters 610A, 610B. Thus, a delay compensation circuit 310 according to embodiments of the present disclosure may comprise a first FIR filter 610A in the first signal path 110A and a second FIR 610B filter in the second signal path 110B. A sum of the first propagation delay of the first signal path 110A and a first filter delay of the first FIR filter 610A essentially equals a sum of the second propagation delay of the second signal path 110B and a second filter delay of the second FIR filter 610B.

FIG. 8B shows an embodiment with individual predictors 710A, 710B. Thus, a delay compensation circuit 310 according to embodiments may comprise a first prediction filter 710A in the first signal path 110A and a second prediction filter 710B in the second signal path 110B. A sum of the first propagation delay of the first signal path 110A and a first prediction time interval of the first prediction filter 710A essentially equals a sum of the second propagation delay of the second signal path 110B and a second prediction time interval of the second prediction filter 710B. Similar to the previously described embodiments, this concept may provide delay-compensated samples. However, it may come with increased overhead because filtering or prediction in the form of a Kalman filter is calculated twice.

In this case, the timing and operation for 2× filter 610A, 610B are straight-forward:

1. Both signal paths 110A, 110B should be triggered synchronously, to provide optimal synchronized information for the two filter blocks 610A, 610B.

2. Due to synchronous sampling, the signals can be compared in time, according to the needs of the functional safety application.

The timing and operation for 2× prediction 710A, 710B are also straight-forward:

1. Both signal paths should be triggered as fast as possible, to provide optimal information for the two prediction blocks 710A, 710B. Due to prediction, estimators for the physical signal of interest are available (virtually without delay) for any time of interest and for both signal paths.

2. Thus, the signals can be compared at any point in time, according to the needs of the functional safety application.

Figure 9:
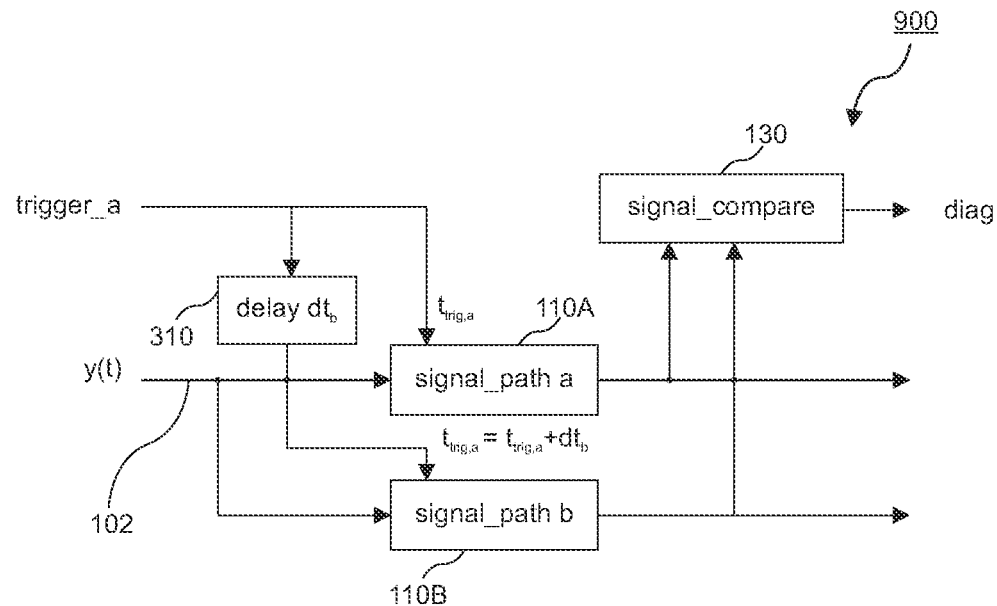
FIG. 9 illustrates a concept of implementing a filter or prediction on both channels with fitted delay to compensate the remaining signal bandwidth and delay difference.

For signal paths with certain properties, also high-speed signal comparison without any kind of prediction is possible, see FIG. 9. In this case, only the "main" signal path 110A is triggered asynchronously (trigger_a). The trigger for the "safety" channel signal path 110B is derived from trigger_a, similarly to the synchronous high-speed signal comparison described previously.

The procedure for this implementation can be as follows:

1. The "main" signal path 110A is triggered at a certain point in time, say $t_{trig,a}$. Signal path 110A acquires and processes the sample $y_a$, which then corresponds to the physical signal of interest at time tea, i.e. $y_a \approx y(t_{ca})$.

2. The delay compensation circuit 910 may trigger 110B a timespan $dt_b$ after $t_{trig,a}$. This may cause the effective sampling times for both signal paths 110A, 110B to coincide. To achieve this, we choose $dt_b=T_{del,a}-T_{del,b}$ and require $dt_b>0$ for causality.

Signal path 110B acquires and processes the sample $y_b$, which corresponds to the physical signal of interest at the very same time as sample $y_a$, i.e. $y_b \approx y(t_{ca})$.

3. The signal comparison block 130 compares the difference of the two samples $y_a$ and $y_b$ against the specified limits. Because both samples correspond to the physical signal of interest at the same point in time, an optimal signal comparison with tight limits and good diagnostic coverage is possible.

A restriction for applicability of the implementation of FIG. 9 are the freedom to trigger signal path 110B synchronously to signal path 110A and $dt_b=T_{del,a}-T_{del,b}>0$ for causality.

As already mentioned before, some embodiments of the present disclosure may be used for functional safe angle-measurement. Accurate angle-measurements using integrated magnetic angle sensors. Recent requirements of angle sensors used for electrical commutation of electric motors decreased to very low values of allowed angle errors. Angle measurement systems today comprise SINE (typically named Y-component) and COSINE (typically named X-component) measurement with adjacent angle calculation using the ARCTAN-function (or also named $\tan^{-1}$):

$$\hat{\alpha} = \tan^{-1}\frac{Y}{X}$$

The problem today is to get very accurate angle measurements in the range <0.2° angle error.

Combinations of angle sensors of different sensor technologies are promising candidates to achieve very accurate angle measurements and furthermore provide redundant and diverse sensing technologies for functional safety applications. Therefore, in embodiments of the present disclosure signal path 110A could be used to determine the first measurement signal 120A of the physical quantity 102 from a first sensor in accordance with a first sensor technology, while signal path 110B could be used to determine the second measurement signal 120A of the physical quantity 102 from a second sensor in accordance with a second sensor technology.

For example, combinations of saturated angle sensors (xMR-based) and linear angle sensors (based e.g. on vertical Hall probes, subsequently denoted VHall) may be used. Each sensing technology has its benefits and weaknesses. For example, xMR-based sensor technologies provide usually better signal-to-noise ratio than Hall-based sensor technologies.

AMR-based sensors provide excellent stability with respect to phase drifts and higher harmonic errors but are usually limited to 180° and show significant drifts of output amplitudes and offsets.

VHall-based sensors provide excellent linearity and minimal residual offsets due to current spinning (offset cancellation) techniques.

Autocalibration methods exist, which compensate the detrimental effects of amplitude- and offset-drifts of xMR-based sensor technologies. However, these methods need at least a half or full mechanical rotation before they can provide any improvements, for AMR or GMR/TMR technologies, respectively. Thus, immediately after start-up, and for very slow rotation speeds, VHall-based sensors could provide a better angle accuracy than xMR-based sensors. Thus, embodiments of the present disclosure also propose optimum angle estimators from combined xMR- and VHall-based sensors, taking into account the status of autocalibration and the angular velocity.

For this purpose, the comparison circuitry 130 may be expanded with additional signal combination functionalities. Comparison circuitry 130 may be configured to receive a first measurement signal $y_a$ of the physical quantity 102 from a first sensor in signal path 110A in accordance with a first sensor technology and to receive at least a second measurement signal $y_b$ of the physical quantity 102 from a second sensor in signal path 110A in accordance with a second sensor technology. The measurement signals may be delay-compensated or time-aligned in accordance with any one of the previously described embodiments. Comparison circuitry 130 may be configured to compute an estimate of the physical quantity based on a combination of the first and the second measurement signals $y_a$, $y_b$. The combination is dependent on an expected accuracy of the first and the second sensor. In some embodiments, the first measurement signal $y_a$ is a first angle estimate from a first angle sensor in accordance with a first angle sensor technology and the second measurement signal $y_b$ is a second angle estimate from a second angle sensor in accordance with a second angle sensor technology. As mentioned before, the first angle sensor technology can be an xMR-based sensor technology, while the second sensor technology can be an VHall-based sensor technology. However, the skilled person having benefit from the present disclosure will appreciate that embodiments of the present disclosure are neither limited to angle sensing nor to this combination of sensors. The principle can be applied to sensing arbitrary physical quantities.

Figure 10:
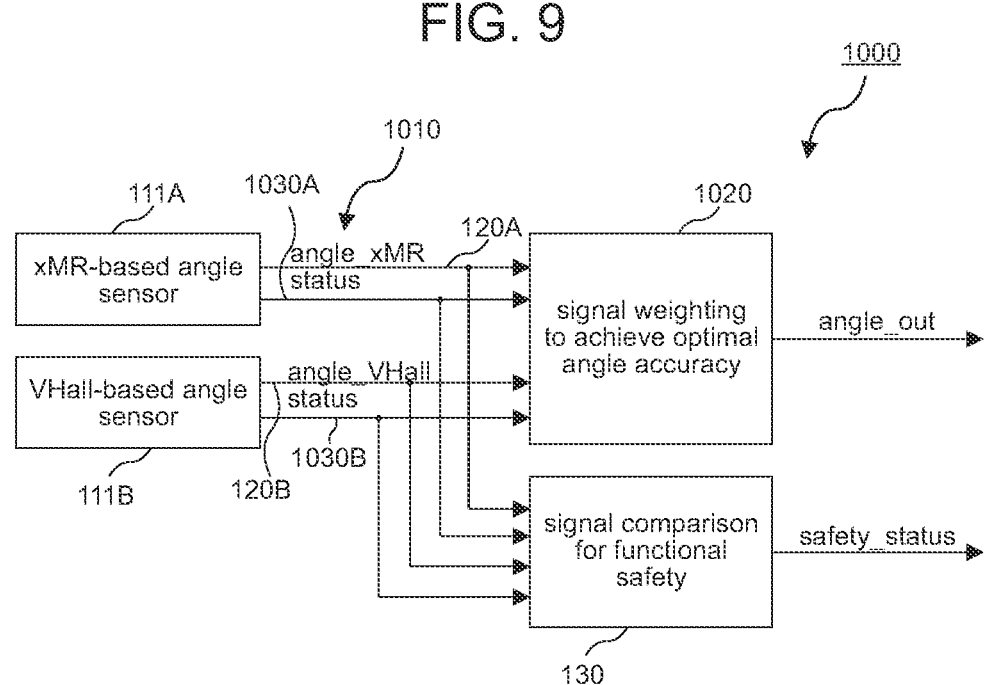
FIG. 10 shows a concept block diagram for obtaining optimal angle estimators from a sensor combining xMR- and VHall-based sensing technologies.

For better understanding, FIG. 10 shows a block diagram of an apparatus 1000 for angle sensing in accordance with embodiments of the present disclosure.

Apparatus 1000 comprises an interface 1010 configured to receive a first angle measurement signal 120A from a first angle sensor 111A in accordance with a first angle sensor technology (e.g. xMR) and to receive at least a second angle measurement signal 120B from a second angle sensor 111B in accordance with a second sensor technology (e.g. VHall). The first angle sensor 111A can be part of a first signal path 110A of a functional safe system. The second angle sensor 111B can be part of a second signal path 110B of the functional safe system. The apparatus 1000 further comprises a processor 1020 configured to compute an estimate of the angle based on a combination of the first and the second angle measurement signals 120A, 120B. The combination is dependent on an expected accuracy of the first and the second angle sensor 111A, 111B.

The processor 1020 may be configured to combine the first and the second angle measurement signals dependent on a current angular velocity and/or on a respective status of the first and the second angle sensors 111A, 111B. For this purpose, the interface 1010 may be configured to receive a first status signal 1030A from the first sensor 111A and to receive a second status signal 1030B from the second angle sensor 111B. The status signals 1030A, 1030B may be indicative of respective observed angular velocities and/or calibration statuses of the angle sensors 111A, 111B.

As mentioned before, the proposed concept is not limited to angle sensing but can be applied to sensing arbitrary physical quantities.

Processor 1020 may be configured to weight the individual sensor signals 120A, 120B based on their expected accuracy. For example, for xMR-based sensors, the accuracy may depend solely on the status of the autocalibration (active or inactive), but not on the rotation speed due to their in general excellent signal to noise performance.

$$\text{error\_xMR} = \begin{cases} \text{error\_xMR\_init,} & \text{if autocal is inactive} \\ \text{error\_xMR\_ac,} & \text{else} \end{cases} \quad (1)$$

For VHall-based sensors, the accuracy may be modeled by the accuracy for static measurements, and a factor proportional to the angular velocity, accounting for the significant averaging time required for reasonable signal-to-noise ratio (SNR).

$$\text{error\_VHall} = \text{error\_VHall\_0} + \omega \cdot T\_\text{eff.} \quad (2)$$

In one example implementation, the angular velocity $\omega$ can be derived from the finite difference quotient of two angle samples, e.g. from the VHall-based angle sensor 111B. As stated above, the VHall-based angle sensor 111B might need a significant averaging time, $T_{av}$, to achieve an adequate SNR. Of course, the sensor's output angle signal 120B is insensitive to variations of the angular velocity, which may happen faster than $T_{av}$. For very slow rotational speeds, the resulting inaccuracies may be negligible, but may become more and more important for faster speeds. For simplicity, it is proposed to assign T_eff to a certain constant fraction of $T_{av}$, e.g. T_eff=$T_{av}$/4.

The processor 1020 may be configured to increase a computational weight of the first angle measurement signal 120A from xMR sensor 111A with respect to the second angle measurement signal 120B from VHall sensor 111B with increasing angular velocity ω. Correspondingly, the processor 1020 may be configured to increase a weight of the second angle measurement signal 120B from VHall sensor 111B with respect to the first angle measurement signal 120A from xMR sensor 111A with decreasing angular velocity ω.

Figure 11:
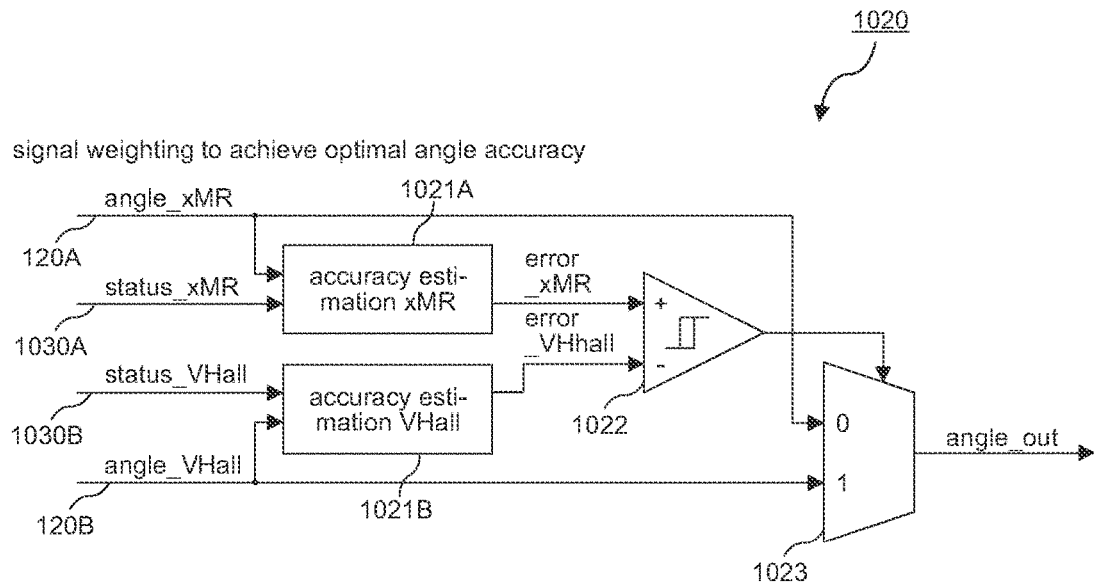
FIG. 11 shows a block diagram for binary signal weighting, based on the estimated angle accuracy, either angle_xMR or angle_VHall are output.

In one embodiment, the weighting scheme may be a pure binary weighting, which just outputs the angle estimate angle_out with the better expected accuracy. A corresponding embodiment of combination processor 1020 is illustrated in FIG. 11.

Combination processor 1020 receives the first angle measurement signal 120A and the first status signal 1030A from xMR sensor 111A as well as the second angle measurement signal 120B and the second status signal 1030B from VHall sensor 111B. Based on the first angle measurement signal 120A and the status signal 1030A, a first error value error_xMR may be determined in a first accuracy estimator 1021A, for example according to eq. (1). Based on the second angle measurement signal 120B and the second status signal 1030B, a second error value error_VHall may be determined in a second accuracy estimator 1021B, for example according to eq. (2). The error signals error_xMR and error_VHall may be compared using a comparator 1022. Based on this comparison, the first angle measurement signal 120A may be selected by selector 1023 as output signal angle_out if error_xMR<error_VHall, or the second angle measurement signal 120B may be selected as output signal angle_out if error_xMR>error_VHall.

Figure 12:
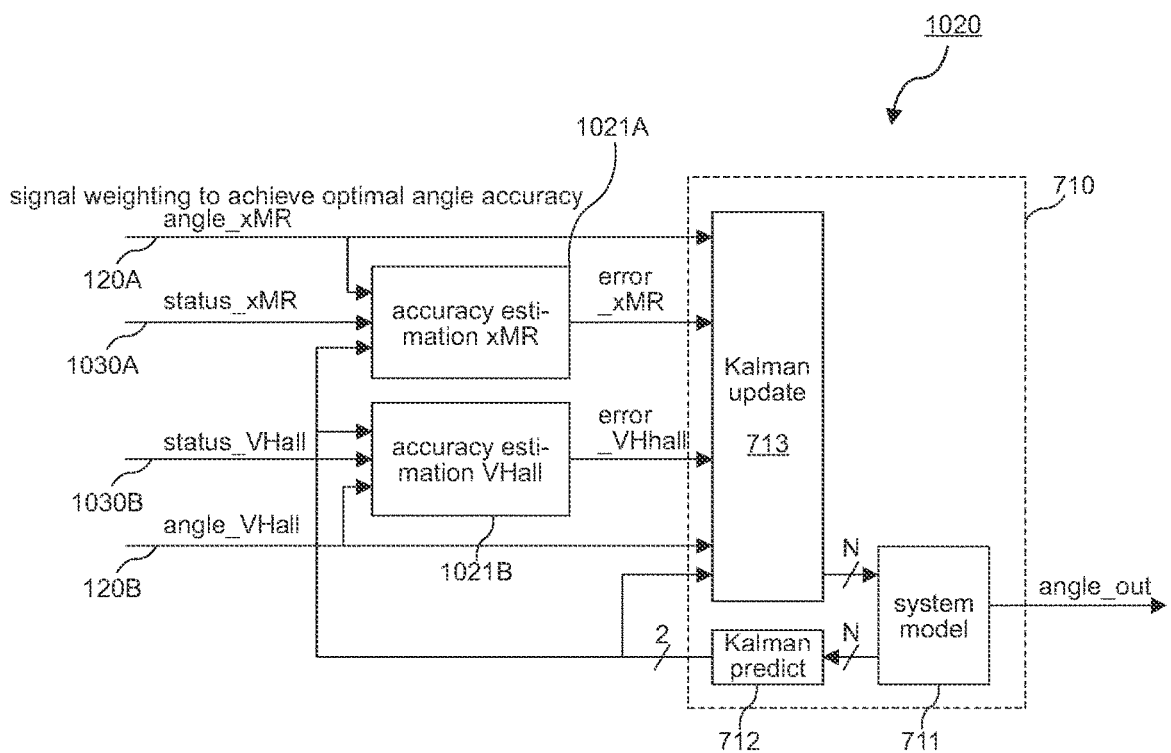
FIG. 12 shows a block diagram for advanced signal weighting using a Kalman filter to achieve the optimal possible angle estimator.

A considerably improved weighting scheme uses an appropriate filter, e.g. a Kalman filter, see FIG. 12.

In FIG. 12, the processor 1020 comprises a Kalman filter 710 configured to compute the angle estimate using the first and the second measurement signals 120A, 120B corrupted with respective measurement errors. As described before, the Kalman filter 710 comprises a system model 711, which describes the time dependence of the quantities of interest— here, the magnetic angle and its time derivatives up to an appropriate order, i.e. angular velocity ω, angular acceleration etc.—and their relationship to the observables—the sensor outputs angle_xMR 120A and angle_VHall 120B. The Kalman filter explicitly takes into account the accuracy of each sampled observable, via the measurement noise covariance. An optimal signal weighting between xMR-based sensor 111A, VHall-based sensor 111B, and already acquired information in the system model 711, is then automatically provided by the Kalman process.

A system model 711 appropriate for most applications may comprise of a two-dimensional state space and a minimal differential equation, given in Eq. (1). Here, φ is the angle, ω is the angular velocity, and the dot denotes the time derivative. It contains the implicit assumption, that the angular velocity remains constant. Higher order models are of course feasible and follow basically the same formalism as derived below.

$$x = \begin{pmatrix} \varphi \\ \omega \end{pmatrix},$$ (1)

$$\dot{x} = \begin{pmatrix} \dot{\varphi} \\ \dot{\omega} \end{pmatrix} = \begin{pmatrix} \omega \\ 0 \end{pmatrix}.$$

A linear system model in the usual convention is given in Eq. (2). Here, u denotes a control input (unnecessary in the example case), y is the vectors of observables y=(angle_xMR, angle_VHall)$^T$, $\tilde{A}$, B, C, and D are the matrices describing state transitions, influence of controls, and measurements. The process noise is modeled with the vector w, whose covariance matrix is denoted $\tilde{Q}$, and the measurement noise by v, whose covariance matrix is denoted by R. Both noise terms are modeled as zero-mean Gaussian noise.

$$\dot{x} = \tilde{A} \cdot x + \tilde{B} \cdot u + w,$$

$$y = C \cdot x + D \cdot u + v.$$ (2)

For the illustrated example, the system matrices can be identified as $$\tilde{A} = \begin{pmatrix} 0 & 1 \\ 0 & 0 \end{pmatrix}, C = \begin{pmatrix} 1 & 0 \\ 1 & 0 \end{pmatrix}, \tilde{B} = D = 0.$$ (3)

Because the errors of the two diverse angle sensor technologies are independent, the off-diagonal elements of the measurement noise covariance matrix vanish, and the matrix is given by $$R = \begin{pmatrix} \text{error\_xMR}^2 & 0 \\ 0 & \text{error\_VHall}^2 \end{pmatrix},$$ (4)

For process noise, it suffices to model the uncertainty in propagating ω. Thus, we find $$\tilde{Q} = \begin{pmatrix} 0 & 0 \\ 0 & \dot{\omega}_{max}^2 \end{pmatrix},$$ (5)

with the maximal angular acceleration $\dot{\omega}_{max}$.

Although it is not necessary, it may be reasonable to calculate the expected errors error_xMR and error_VHall with the already available information from the system model 711 and feed them back to accuracy estimators 1021A, 1021B. Thus, it is proposed to use the ω from the system model 711, see Eq. (1), to calculate the error_VHall with Eq. (2).

For discrete systems with a finite sampling time $T_s$, however, the state representation may be given in terms of finite differences by $$x_{k+1} = A \cdot x_k + B \cdot u_k + w_k,$$

$$y_k = C \cdot x_k + D \cdot u_k + v_k.$$ (6)

In this representation, the system matrices differ slightly, and are given by $$A = \begin{pmatrix} 1 & T_s \\ 0 & 1 \end{pmatrix}, C = \begin{pmatrix} 1 & 0 \\ 1 & 0 \end{pmatrix}, B = D = 0.$$ (7)

Equivalently, the process noise covariance matrix may be adapted, resulting in $$Q = \begin{pmatrix} 0 & 0 \\ 0 & (T_s \cdot \dot{\omega}_{max})^2 \end{pmatrix}. \quad (8)$$

The measurement noise covariance matrix, R, remains the same as in the continuous model.

Of course, the discrete model is based on the same implicit assumption as the continuous model, that the angular velocity remains constant. This is reasonably well justified, as long as the error due to the maximum angular acceleration $|T_s^2 \cdot \dot{\omega}_{max}/2|$ is small compared to the targeted angular accuracy.

Refer to the literature for derivation of the Kalman equations. For each sample, in general we
1. predict the outcome of the system model via Eq. (9),
2. obtain the measurement samples $y_k$, and
3. update the system model via Eq. (10).

Kalman Prediction:

$$\bar{x}_k = A \cdot x_{k-1}, \bar{P}_k = A \cdot P_{k-1} \cdot A^T + Q. \quad (9)$$

Kalman Update:

$$K_k = \frac{\bar{P}_k \cdot C^T}{C \cdot \bar{P}_k \cdot C^T + R}, x_k = \bar{x}_k + K_k \cdot (y_k - C \cdot \bar{x}_k), \quad (10)$$

$$P_k = (\mathbb{1} - K_k \cdot C) \cdot \bar{P}_k.$$

The expected accuracies of the xMR- and the VHall-based angle sensors 111A, 111B determine the measurement covariance matrix, which is used to calculate the Kalman gain $K_k$. The Kalman gain, in turn, may determine the weights assigned to their respective measurement samples $y_k = (\text{angle\_xMR}, \text{angle\_VHall})^T$.

Of course, the angles $\varphi_k$ and $\bar{\varphi}_k$ should to be 360°-periodic. Therefore, most assignments in above equations have to be wrapped to 360°, and the subtractions wrapped to ±180°.

In conventional systems, the angle accuracy without autocalibration (i.e. directly after startup, at very slow rotations, and for start-stop use-cases) of AMR sensors may be insufficient to fulfill tight accuracy requirements. Embodiments may enable to design a better product, with suitable angle accuracies in all relevant use-cases.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for comparing a first signal and a second signal, the apparatus comprising:
   a first signal path for a first measurement signal of a physical quantity, wherein the first signal path comprises a first sensor element configured to transform the physical quantity into the first measurement signal, and wherein the first signal path has a first signal propagation delay;
   a second signal path for a second measurement signal of the physical quantity, wherein the second signal path comprises a second sensor element configured to transform the physical quantity into the second measurement signal, the first sensor element and the second sensor element being different sensor elements, and wherein the second signal path has a second signal propagation delay different from the first signal propagation delay;
   a delay compensation circuit configured to compensate for a difference between the first and the second signal propagation delays to generate a delay-compensated first measurement signal corresponding to the first measurement signal and a delay-compensated second measurement signal corresponding to the second measurement signal;
   comparison circuitry configured to compare the delay-compensated first measurement signal and the delay-compensated second measurement signal;
   a first sample acquisition circuit configured to receive the first measurement signal, receive a first trigger pulse, and start acquiring a first plurality of samples of the first measurement signal in response to receiving the first trigger pulse, the delay-compensated first measurement signal being made up of the first plurality of samples; and
   a second sample acquisition circuit configured to receive the second measurement signal, receive a second trigger pulse, and start acquiring a second plurality of samples of the second measurement signal in response to receiving the second trigger pulse, the delay-compensated second measurement signal being made up of the second plurality of samples,
   wherein the delay compensation circuit is configured to:
      generate the first trigger pulse at a first trigger time,
      generate the second trigger pulse at a second trigger time, and
   wherein the first trigger time and the second trigger time occur at different times such that an initial measurement sample of the first plurality of samples and an initial measurement sample of the second plurality of samples have a same effective sampling time.

2. The apparatus of claim 1, wherein the first sensor element or one or more first circuit components of the first signal path cause the first signal propagation delay, and
   wherein the second sensor element or one or more second circuit components of the second signal path cause the second signal propagation delay.

3. The apparatus of claim 1, wherein the delay compensation circuit is configured to trigger, with the first trigger pulse, sample acquisition and signal processing of the first signal path and trigger, with the second trigger pulse, sample acquisition and signal processing of the second signal path at different time instances to obtain the delay-compensated first measurement signal and the delay-compensated second measurement signal at respective outputs of the first and the second signal paths.

4. The apparatus of claim 3, wherein a difference between the first trigger time and the second trigger time is based on a difference between the first and the second signal propagation delays.

5. The apparatus of claim 3, wherein the delay compensation circuit is configured to trigger the sample acquisition and signal processing of the first signal path earlier than the sample acquisition and signal processing of the second signal path if the first signal propagation delay is longer than the second signal propagation delay and trigger the sample acquisition and signal processing of the second signal path earlier than the sample acquisition and signal processing of the first signal path if the second signal propagation delay is longer than the first signal propagation delay.

6. The apparatus of claim 3, wherein a difference between a first trigger time for the first signal processing of the first signal path and a second trigger time for the second signal processing of the second signal path is based on a difference in a first sampling period and a second sampling period, wherein the first sampling period is used in the first signal path to generate the first measurement signal comprising samples acquired according to the first sampling period, wherein the second sampling period is used in the second signal path to generate the second measurement signal comprising samples acquired according to the second sampling period, and wherein the first and the second sampling periods are different.

7. The apparatus of claim 1, wherein the delay compensation circuit comprises a filter circuit configured to generate a first filtered measurement signal for the first signal path, wherein the first filtered measurement signal is time-aligned with the second measurement signal.

8. The apparatus of claim 7, wherein the filter circuit comprises, in the first signal path, a finite impulse response (FIR) filter having a filter delay corresponding to a difference between the first and the second signal propagation delays.

9. The apparatus of claim 8, wherein the first signal propagation delay is shorter than the second signal propagation delay, and the FIR filter is included in the first signal path to compensate for the first signal propagation delay.

10. The apparatus of claim 7, wherein the filter circuit comprises, in the first signal path or the second signal path, a prediction filter having a prediction time interval corresponding to a difference between the first and the second signal propagation delays.

11. The apparatus of claim 10, wherein the prediction filter comprises a Kalman filter.

12. The apparatus of claim 10, wherein the prediction filter is included in the first signal path or the second signal path having a longer signal propagation delay.

13. The apparatus of claim 7, wherein the filter circuit is configured to generate a second filtered measurement signal for the second signal path, wherein the second filtered measurement signal is time-aligned with the first measurement signal.

14. The apparatus of claim 13, wherein the first filtered measurement signal is the delay-compensated first measurement signal and the second filtered measurement signal is the delay-compensated second measurement signal.

15. The apparatus of claim 7, wherein the filter circuit is configured to generate a second filtered measurement signal for the second signal path,
wherein the delay compensation circuit comprises a first sample and hold circuit configured to receive the first filtered measurement signal, and a second sample and hold circuit configured to receive the second filtered measurement signal,
wherein the first sample and hold circuit is configured to receive the first filtered measurement signal, and impose a first delay on the first filtered measurement signal to generate the delay-compensated first measurement signal, and
wherein the second sample and hold circuit is configured to receive the second filtered measurement signal, and impose a second delay on the first filtered measurement signal to generate the delay-compensated second measurement signal.

16. The apparatus of claim 1, wherein the delay compensation circuit comprises a filter circuit configured to generate a first filtered measurement signal for the first signal path and a second filtered measurement signal for the second signal path,
wherein the first filtered measurement signal is time-aligned with the second filtered measurement signal,
wherein the filter circuit comprises a first finite impulse response (FIR) filter in the first signal path and a second FIR filter in the second signal path, and
wherein a sum of the first signal propagation delay and a first filter delay of the first FIR filter equals a sum of the second signal propagation delay and a second filter delay of the second FIR filter.

17. The apparatus of claim 1, wherein the delay compensation circuit comprises a filter circuit configured to generate a first filtered measurement signal for the first signal path and a second filtered measurement signal for the second signal path,
wherein the first filtered measurement signal is time-aligned with the second filtered measurement signal,
wherein the filter circuit comprises a first prediction filter in the first signal path and a second prediction filter in the second signal path, and
wherein a sum of the first signal propagation delay and a first prediction time interval of the first prediction filter equals a sum of the second signal propagation delay and a second prediction time interval of the second prediction filter.

18. The apparatus of claim 1, wherein the comparison circuitry is configured to trigger a safety alert if the delay-compensated first and second measurement signals differ by more than a predefined threshold.

19. The apparatus of claim 1, further comprising:
an interface configured to receive the delay-compensated first measurement signal from a first sensor in accordance with a first sensor technology and to receive the delay-compensated second measurement signal from a second sensor in accordance with a second sensor technology; and a processor configured to compute an estimate of the physical quantity based on a combination of the delay-compensated first and second measurement signals, wherein a result of the combination is dependent on an expected accuracy of the first and the second sensors.

20. The apparatus of claim 19, wherein the processor is configured to combine the first and the second measurement signals dependent on a current change rate of the physical quantity or based on a respective status of the first and the second sensors.

21. The apparatus of claim 1, wherein the comparison circuitry is configured to determine a difference between the delay-compensated first measurement signal and the delay-compensated second measurement signal, and compare the difference between the delay-compensated first measurement signal and the delay-compensated first second measurement signal to one or more thresholds for signaling an error.

22. The apparatus of claim 1, wherein a difference between the first trigger time for the first signal processing of the first signal path and the second trigger time for the second signal processing of the second signal path is based on a difference between the first and the second signal propagation delays.

23. The apparatus of claim 1, wherein the comparison circuitry is configured to receive the initial measurement sample of the first plurality of samples and the initial measurement sample of the second plurality of samples at a same time, and compare the initial measurement sample of the first plurality of samples and the initial measurement sample of the second plurality of samples to determine a difference between the initial measurement sample of the first plurality of samples and the initial measurement sample of the second plurality of samples.

24. A method for comparing a first signal and a second signal, the method comprising:
providing, by a first sensor element, a first measurement signal of a physical quantity via a first signal path having a first signal propagation delay;
providing, by a second sensor element, a second measurement signal of the physical quantity via a second signal path having a second signal propagation delay different from the first signal propagation delay;
compensating for a difference between the first signal propagation delay and the second signal propagation delay to generate a delay-compensated first measurement signal and a second delay-compensated measurement signal, including:
generating, by a delay compensation circuit, a first trigger pulse at a first trigger time,
generating, by the delay compensation circuit, a second trigger pulse at a second trigger time,
in response to receiving the first trigger pulse, start acquiring, by a first sample acquisition circuit, a first plurality of samples of the first measurement signal, the delay-compensated first measurement signal being made up of the first plurality of samples; and
in response to receiving the second trigger pulse, start acquiring, by a second sample acquisition circuit, a second plurality of samples of the second measurement signal, the delay-compensated second measurement signal being made up of the second plurality of samples,
wherein the first trigger time and the second trigger time occur at different times such that an initial measurement sample of the first plurality of samples and an initial measurement sample of the second plurality of samples have a same effective sampling time; and comparing, by a comparison circuit, the delay-compensated first measurement signal and the delay-compensated second measurement signal.

25. An apparatus for comparing a first signal and a second signal, the apparatus comprising:
- a first signal path for a first measurement signal of a physical quantity, wherein the first signal path comprises a first sensor element configured to transform the physical quantity into the first measurement signal, and wherein the first signal path has a first signal propagation delay;
- a second signal path for a second measurement signal of the physical quantity, wherein the second signal path comprises a second sensor element configured to transform the physical quantity into the second measurement signal, the first sensor element and the second sensor element being different sensor elements, and wherein the second signal path has a second signal propagation delay different from the first signal propagation delay,
    - wherein the first sensor element or one or more first circuit components of the first signal path cause the first signal propagation delay, and
    - wherein the second sensor element or one or more second circuit components of the second signal path cause the second signal propagation delay;
- a delay compensation circuit configured to compensate for a difference between the first and the second signal propagation delays to generate a delay-compensated first measurement signal corresponding to the first measurement signal and a delay-compensated second measurement signal corresponding to the second measurement signal,
- wherein the delay compensation circuit is configured to trigger a first sample acquisition of the first signal path and a second sample acquisition of the second signal path at different time instances to obtain the delay-compensated first measurement signal and the delay-compensated second measurement signal at respective outputs of the first signal path and the second signal path; and
- comparison circuitry configured to compare the delay-compensated first measurement signal and the delay-compensated second measurement signal.

26. The apparatus of claim 25, wherein the comparison circuitry is configured to trigger a safety alert if the delay-compensated first and second measurement signals differ by more than a predefined threshold.

27. The apparatus of claim 25, wherein the comparison circuitry is configured to determine a difference between the delay-compensated first measurement signal and the delay-compensated first measurement signal, and compare the difference to one or more thresholds for signaling an error.

28. The apparatus of claim 25, wherein the first sample acquisition includes acquiring a first measurement sample according to a first trigger pulse provided by the delay compensation circuit at a first trigger time, the delay-compensated first measurement signal comprising the first measurement sample,
- wherein the second sample acquisition includes acquiring a second measurement sample according to a second trigger pulse provided by the delay compensation circuit at a second trigger time, the delay-compensated second measurement signal comprising the second measurement sample,
- wherein the first trigger time and the second trigger time are different, and
- wherein the first measurement sample and the second measurement sample have a same effective sampling time.

29. The apparatus of claim 28, wherein the comparison circuitry is configured to compare the first measurement sample and the second measurement sample.

30. The apparatus of claim 25, wherein the delay compensation circuit comprises a filter circuit configured to generate a first filtered measurement signal for the first signal path, and
- wherein the first filtered measurement signal is time-aligned with the second measurement signal.

31. The apparatus of claim 30, wherein the delay compensation circuit comprises a first sample and hold circuit configured to receive the first filtered measurement signal, and
- wherein the first sample and hold circuit is configured to equalize a timing of the first filtered measurement signal with the second measurement signal.

* * * * *